(12) United States Patent
Hall et al.

(10) Patent No.: US 12,097,740 B1
(45) Date of Patent: Sep. 24, 2024

(54) CONTROL SYSTEM

(71) Applicants: Jonathan L. Hall, Menlo Park, CA (US); Matisse J. Milovich, Cupertino, CA (US); Paul J. Keas, San Jose, CA (US); Neal M. Lackritz, Mountain View, CA (US)

(72) Inventors: Jonathan L. Hall, Menlo Park, CA (US); Matisse J. Milovich, Cupertino, CA (US); Paul J. Keas, San Jose, CA (US); Neal M. Lackritz, Mountain View, CA (US)

(73) Assignee: APPLE INC., Cupertino, CA (US)

(*) Notice: Subject to any disclaimer, the term of this patent is extended or adjusted under 35 U.S.C. 154(b) by 241 days.

(21) Appl. No.: 17/677,258

(22) Filed: Feb. 22, 2022

Related U.S. Application Data

(63) Continuation of application No. 16/567,482, filed on Sep. 11, 2019, now Pat. No. 11,285,773.

(60) Provisional application No. 62/730,058, filed on Sep. 12, 2018.

(51) Int. Cl.
*B60G 17/0165* (2006.01)
*B60G 17/016* (2006.01)
*B60G 17/02* (2006.01)
*B60G 17/06* (2006.01)

(52) U.S. Cl.
CPC ......... *B60G 17/06* (2013.01); *B60G 17/0161* (2013.01); *B60G 17/0164* (2013.01); *B60G 17/0165* (2013.01); *B60G 17/021* (2013.01); *B60G 2400/821* (2013.01); *B60G 2400/823* (2013.01); *B60G 2400/824* (2013.01)

(58) Field of Classification Search
CPC ............... B60G 17/06; B60G 17/0161; B60G 17/0164; B60G 17/0165; B60G 17/021; B60G 2400/823; B60G 2400/824; B60G 2400/821
See application file for complete search history.

(56) References Cited

U.S. PATENT DOCUMENTS

| 2,757,938 A | 8/1956 | Crowder |
| 2,901,239 A | 8/1959 | Sethna |
| 2,913,252 A | 11/1959 | Norrie |

(Continued)

FOREIGN PATENT DOCUMENTS

| CN | 108215946 A | 6/2018 |
| CN | 208439009 U | 1/2019 |

(Continued)

OTHER PUBLICATIONS

Monroe Intelligent Suspension, "CVSA2/KINETIC: Low Energy For High Performance", www.monroeintelligentsuspension.com/products/cvsa2-kinetic/, Date Unknown, Downloaded Mar. 2, 2017, 2 pp.

(Continued)

*Primary Examiner* — Toan C To
(74) *Attorney, Agent, or Firm* — Young Basile Hanlon & MacFarlane, P.C.

(57) ABSTRACT

A support system includes a primary actuator that transfers force between a sprung mass and an unsprung mass. A control system operates the primary actuator to provide additional control when a damper exceeds a capacity threshold. The control system changes the capacity threshold according to the environmental condition.

20 Claims, 17 Drawing Sheets

(56) References Cited

U.S. PATENT DOCUMENTS

| | | | |
|---|---|---|---|
| 3,089,710 A | 5/1963 | Ernest |
| 3,236,334 A | 2/1966 | Wallerstein, Jr. |
| 3,322,379 A | 5/1967 | Flannelly |
| 3,368,824 A | 2/1968 | Julien |
| 3,441,238 A | 4/1969 | Flannelly |
| 3,781,032 A | 12/1973 | Jones |
| 3,970,162 A | 7/1976 | Le Salver et al. |
| 4,206,935 A | 6/1980 | Sheppard et al. |
| 4,379,572 A | 4/1983 | Hedenberg |
| 4,530,514 A | 7/1985 | Ito |
| 4,537,420 A | 8/1985 | Ito et al. |
| 4,589,678 A | 5/1986 | Lund |
| 4,606,440 A | 8/1986 | Buchanan, Jr. et al. |
| 4,613,152 A | 9/1986 | Booher |
| 4,614,359 A | 9/1986 | Lundin et al. |
| 4,634,142 A | 1/1987 | Woods et al. |
| 4,637,628 A | 1/1987 | Perkins |
| 4,643,270 A | 2/1987 | Beer |
| 4,659,106 A | 4/1987 | Fujita et al. |
| 4,784,378 A | 11/1988 | Ford |
| 4,834,416 A | 5/1989 | Shimoe et al. |
| 4,893,832 A | 1/1990 | Booher |
| 4,922,159 A | 5/1990 | Phillips et al. |
| 4,960,290 A | 10/1990 | Bose |
| 4,981,309 A | 1/1991 | Froeschle et al. |
| 4,991,698 A | 2/1991 | Hanson |
| 5,027,048 A | 6/1991 | Masrur et al. |
| 5,033,028 A | 7/1991 | Browning |
| 5,060,959 A | 10/1991 | Davis et al. |
| 5,172,930 A | 12/1992 | Boye et al. |
| 5,244,053 A | 9/1993 | Kashiwagi |
| 5,251,926 A | 10/1993 | Aulerich et al. |
| 5,364,081 A | 11/1994 | Hartl |
| 5,401,053 A | 3/1995 | Sahm et al. |
| 5,409,254 A | 4/1995 | Minor et al. |
| 5,468,055 A | 11/1995 | Simon et al. |
| 5,507,518 A | 4/1996 | Nakahara et al. |
| 5,517,414 A | 5/1996 | Hrovat |
| 5,645,250 A | 7/1997 | Gevers |
| 5,678,847 A | 10/1997 | Izawa et al. |
| 5,785,345 A | 7/1998 | Barlas et al. |
| 5,810,335 A | 9/1998 | Wirtz et al. |
| 5,829,764 A | 11/1998 | Griffiths |
| 5,880,542 A | 3/1999 | Leary et al. |
| 6,032,770 A | 3/2000 | Alcone et al. |
| 6,113,119 A | 9/2000 | Laurent et al. |
| 6,142,494 A | 11/2000 | Higuchi |
| 6,170,838 B1 | 1/2001 | Laurent et al. |
| 6,219,602 B1 * | 4/2001 | Badenoch ............ B60G 17/016 180/41 |
| 6,233,510 B1 * | 5/2001 | Platner ................. B60G 13/16 382/104 |
| 6,234,492 B1 * | 5/2001 | Platner ................. B60G 11/00 280/5.515 |
| 6,249,728 B1 | 6/2001 | Streiter |
| 6,276,710 B1 | 8/2001 | Sutton |
| 6,314,353 B1 * | 11/2001 | Ohsaku .............. B60G 17/018 701/1 |
| 6,357,770 B1 | 3/2002 | Carpiaux et al. |
| 6,364,078 B1 | 4/2002 | Parison et al. |
| 6,443,436 B1 | 9/2002 | Schel |
| 6,470,248 B2 | 10/2002 | Shank et al. |
| 6,502,837 B1 | 1/2003 | Hamilton et al. |
| 6,513,819 B1 | 2/2003 | Oliver et al. |
| 6,634,445 B2 | 10/2003 | Dix et al. |
| 6,637,561 B1 | 10/2003 | Collins et al. |
| 6,873,891 B2 | 3/2005 | Moser et al. |
| 6,926,288 B2 | 8/2005 | Bender |
| 6,940,248 B2 | 9/2005 | Maresca et al. |
| 6,945,541 B2 | 9/2005 | Brown |
| 7,017,690 B2 | 3/2006 | Burke |
| 7,032,723 B2 | 4/2006 | Quaglia et al. |
| 7,051,851 B2 | 5/2006 | Svartz et al. |
| 7,140,601 B2 | 11/2006 | Nesbitt et al. |
| 7,195,250 B2 | 3/2007 | Knox et al. |
| 7,202,577 B2 | 4/2007 | Parison et al. |
| 7,302,825 B2 | 12/2007 | Knox |
| 7,308,351 B2 | 12/2007 | Knoop et al. |
| 7,392,997 B2 | 7/2008 | Sanville et al. |
| 7,401,794 B2 | 7/2008 | Laurent et al. |
| 7,421,954 B2 | 9/2008 | Bose |
| 7,427,072 B2 | 9/2008 | Brown |
| 7,484,744 B2 | 2/2009 | Galazin et al. |
| 7,502,589 B2 | 3/2009 | Howard et al. |
| 7,543,825 B2 | 6/2009 | Yamada |
| 7,551,749 B2 | 6/2009 | Rosen et al. |
| 7,641,010 B2 | 1/2010 | Mizutani et al. |
| 7,644,938 B2 | 1/2010 | Yamada |
| 7,654,540 B2 | 2/2010 | Parison et al. |
| 7,818,109 B2 | 10/2010 | Scully |
| 7,823,891 B2 | 11/2010 | Bushko et al. |
| 7,932,684 B2 | 4/2011 | O'Day et al. |
| 7,962,261 B2 | 6/2011 | Bushko et al. |
| 7,963,529 B2 | 6/2011 | Oteman et al. |
| 7,976,038 B2 | 7/2011 | Gregg |
| 8,047,551 B2 | 11/2011 | Morris et al. |
| 8,067,863 B2 | 11/2011 | Giovanardi |
| 8,095,268 B2 | 1/2012 | Parison et al. |
| 8,099,213 B2 | 1/2012 | Zhang et al. |
| 8,109,371 B2 | 2/2012 | Kondo et al. |
| 8,112,198 B2 | 2/2012 | Parison, Jr. et al. |
| 8,113,522 B2 | 2/2012 | Oteman et al. |
| 8,127,900 B2 | 3/2012 | Inoue |
| 8,157,036 B2 | 4/2012 | Yogo et al. |
| 8,165,749 B2 * | 4/2012 | Izawa ................ B60G 17/0152 280/5.506 |
| 8,191,874 B2 | 6/2012 | Inoue et al. |
| 8,282,149 B2 | 10/2012 | Kniffin et al. |
| 8,325,144 B1 | 12/2012 | Tierling et al. |
| 8,336,319 B2 | 12/2012 | Johnston et al. |
| 8,356,861 B2 | 1/2013 | Kniffin et al. |
| 8,360,387 B2 | 1/2013 | Breen et al. |
| 8,370,022 B2 | 2/2013 | Inoue et al. |
| 8,387,762 B2 | 3/2013 | Kondo et al. |
| 8,417,417 B2 | 4/2013 | Chen et al. |
| 8,428,305 B2 | 4/2013 | Zhang et al. |
| 8,466,639 B2 | 6/2013 | Parison, Jr. et al. |
| 8,490,761 B2 | 7/2013 | Kondo |
| 8,499,903 B2 | 8/2013 | Sakuta et al. |
| 8,525,453 B2 | 9/2013 | Ogawa |
| 8,548,678 B2 | 10/2013 | Ummethala et al. |
| 8,579,311 B2 | 11/2013 | Butlin, Jr. et al. |
| 8,598,831 B2 | 12/2013 | Ogawa et al. |
| 8,632,078 B2 | 1/2014 | Ehrlich et al. |
| 8,641,052 B2 | 2/2014 | Kondo et al. |
| 8,641,053 B2 | 2/2014 | Pare et al. |
| 8,668,060 B2 | 3/2014 | Kondo et al. |
| 8,682,530 B2 | 3/2014 | Nakamura |
| 8,701,845 B2 | 4/2014 | Kondo |
| 8,725,351 B1 | 5/2014 | Selden et al. |
| 8,744,680 B2 | 6/2014 | Rieger et al. |
| 8,744,694 B2 | 6/2014 | Ystueta |
| 8,757,309 B2 | 6/2014 | Schmitt et al. |
| 8,783,430 B2 | 7/2014 | Brown |
| 8,890,461 B2 | 11/2014 | Knox et al. |
| 8,930,074 B1 * | 1/2015 | Lin .................... B60G 17/0165 701/36 |
| 8,938,333 B2 | 1/2015 | Bose et al. |
| 9,062,983 B2 | 6/2015 | Zych |
| 9,079,473 B2 | 7/2015 | Lee et al. |
| 9,102,209 B2 | 8/2015 | Giovanardi et al. |
| 9,291,300 B2 | 3/2016 | Parker et al. |
| 9,316,667 B2 | 4/2016 | Ummethala et al. |
| 9,349,304 B2 | 5/2016 | Sangermano, II et al. |
| 9,399,384 B2 | 7/2016 | Lee et al. |
| 9,428,029 B2 | 8/2016 | Job |
| 9,533,539 B2 * | 1/2017 | Eng ..................... B60G 17/019 |
| 9,550,495 B2 | 1/2017 | Tatourian et al. |
| 9,625,902 B2 | 4/2017 | Knox |
| 9,643,467 B2 | 5/2017 | Selden et al. |
| 9,702,349 B2 | 7/2017 | Anderson et al. |
| 9,855,887 B1 | 1/2018 | Potter et al. |
| 9,868,332 B2 | 1/2018 | Anderson et al. |
| 9,975,391 B2 | 5/2018 | Tseng et al. |

(56) References Cited

U.S. PATENT DOCUMENTS

| | | |
|---|---|---|
| 10,011,213 B1 | 7/2018 | Palmer |
| 10,065,474 B2 | 9/2018 | Trangbaek |
| 10,081,408 B2 | 9/2018 | Yoshida |
| 10,093,145 B1 | 10/2018 | Vaughan et al. |
| 10,245,984 B2 | 4/2019 | Parker et al. |
| 10,300,760 B1 | 5/2019 | Aikin et al. |
| 10,315,481 B2 | 6/2019 | Lu et al. |
| 10,377,371 B2 | 8/2019 | Anderson et al. |
| 10,407,035 B1 | 9/2019 | Gadda et al. |
| 10,466,717 B1 | 11/2019 | Su et al. |
| 10,513,161 B2 | 12/2019 | Anderson et al. |
| 10,906,370 B1 * | 2/2021 | Hall .................. B60G 17/0157 |
| 11,285,773 B1 * | 3/2022 | Hall .................. B60G 17/0161 |
| 2001/0045719 A1 | 11/2001 | Smith |
| 2002/0089107 A1 | 7/2002 | Koh |
| 2002/0144850 A1 | 10/2002 | Gogo |
| 2002/0190486 A1 | 12/2002 | Phillis et al. |
| 2003/0030241 A1 | 2/2003 | Lawson |
| 2003/0080526 A1 | 5/2003 | Conover |
| 2004/0015279 A1 * | 1/2004 | Barron .................. B60G 17/08 |
| | | 701/37 |
| 2004/0054455 A1 | 3/2004 | Voight et al. |
| 2004/0074720 A1 | 4/2004 | Thieltges |
| 2004/0094912 A1 * | 5/2004 | Niwa ................ B60G 17/0165 |
| | | 280/5.518 |
| 2004/0226788 A1 | 11/2004 | Tanner |
| 2004/0245732 A1 | 12/2004 | Kotulla et al. |
| 2005/0051986 A1 | 3/2005 | Galazin et al. |
| 2005/0096171 A1 | 5/2005 | Brown et al. |
| 2005/0199457 A1 | 9/2005 | Beck |
| 2005/0206231 A1 | 9/2005 | Lu et al. |
| 2005/0211516 A1 | 9/2005 | Kondo et al. |
| 2005/0247496 A1 | 11/2005 | Nagaya |
| 2006/0043804 A1 | 3/2006 | Kondou |
| 2006/0076828 A1 | 4/2006 | Lu et al. |
| 2006/0119064 A1 | 6/2006 | Mizuno et al. |
| 2006/0181034 A1 | 8/2006 | Wilde et al. |
| 2006/0266599 A1 | 11/2006 | Denys et al. |
| 2006/0273530 A1 | 12/2006 | Zuber |
| 2007/0069496 A1 | 3/2007 | Rinehart et al. |
| 2007/0107959 A1 | 5/2007 | Suzuki et al. |
| 2007/0114706 A1 | 5/2007 | Myers |
| 2007/0199750 A1 | 8/2007 | Suzuki et al. |
| 2007/0210539 A1 | 9/2007 | Hakui et al. |
| 2008/0017462 A1 | 1/2008 | Mizutani et al. |
| 2008/0100020 A1 | 5/2008 | Gashi et al. |
| 2008/0111334 A1 | 5/2008 | Inoue et al. |
| 2008/0164111 A1 | 7/2008 | Inoue et al. |
| 2008/0185807 A1 | 8/2008 | Takenaka |
| 2008/0234900 A1 * | 9/2008 | Bennett .............. B60G 17/0195 |
| | | 701/48 |
| 2008/0243334 A1 * | 10/2008 | Bujak ................ B60G 17/0195 |
| | | 701/37 |
| 2008/0283315 A1 | 11/2008 | Suzuki et al. |
| 2009/0033055 A1 | 2/2009 | Morris et al. |
| 2009/0064808 A1 | 3/2009 | Parison et al. |
| 2009/0095584 A1 | 4/2009 | Kondo et al. |
| 2009/0120745 A1 | 5/2009 | Kondo et al. |
| 2009/0121398 A1 | 5/2009 | Inoue |
| 2009/0173585 A1 | 7/2009 | Kappagantu |
| 2009/0174158 A1 | 7/2009 | Anderson et al. |
| 2009/0198419 A1 | 8/2009 | Clark |
| 2009/0218867 A1 | 9/2009 | Clark |
| 2009/0243402 A1 | 10/2009 | O'Day et al. |
| 2009/0243598 A1 | 10/2009 | O'Day |
| 2009/0273147 A1 * | 11/2009 | Inoue .................. F16F 15/03 |
| | | 280/5.505 |
| 2009/0286910 A1 | 11/2009 | Bloomfield |
| 2009/0302559 A1 | 12/2009 | Doerfel |
| 2009/0321201 A1 | 12/2009 | Sakuta et al. |
| 2010/0044977 A1 | 2/2010 | Hughes et al. |
| 2010/0059959 A1 | 3/2010 | Kim |
| 2010/0200343 A1 | 8/2010 | Kondo et al. |
| 2010/0207344 A1 | 8/2010 | Nakamura |
| 2010/0222960 A1 | 9/2010 | Oida et al. |
| 2010/0230876 A1 | 9/2010 | Inoue et al. |
| 2010/0252376 A1 | 10/2010 | Chern et al. |
| 2010/0253019 A1 | 10/2010 | Ogawa |
| 2011/0115183 A1 | 5/2011 | Alesso et al. |
| 2011/0277241 A1 | 11/2011 | Schejbal |
| 2012/0013277 A1 | 1/2012 | Ogawa |
| 2012/0053789 A1 * | 3/2012 | Noumura ............ B60W 40/068 |
| | | 701/37 |
| 2012/0059547 A1 | 3/2012 | Chen et al. |
| 2012/0109483 A1 | 5/2012 | O'Dea et al. |
| 2012/0153718 A1 | 6/2012 | Rawlinson et al. |
| 2012/0181757 A1 | 7/2012 | Oteman et al. |
| 2012/0187640 A1 | 7/2012 | Kondo et al. |
| 2012/0193847 A1 | 8/2012 | Muragishi et al. |
| 2012/0305348 A1 | 12/2012 | Katayama et al. |
| 2012/0306170 A1 | 12/2012 | Serbu et al. |
| 2013/0060422 A1 | 3/2013 | Ogawa et al. |
| 2013/0060423 A1 | 3/2013 | Jolly |
| 2013/0103259 A1 * | 4/2013 | Eng .................... B60G 17/0165 |
| | | 701/37 |
| 2013/0106074 A1 | 5/2013 | Koku et al. |
| 2013/0158799 A1 * | 6/2013 | Kamimura ......... B60G 17/0165 |
| | | 701/40 |
| 2013/0221625 A1 | 8/2013 | Pare et al. |
| 2013/0229074 A1 | 9/2013 | Haferman et al. |
| 2013/0233632 A1 | 9/2013 | Kim et al. |
| 2013/0253764 A1 * | 9/2013 | Kikuchi ............... B60G 17/016 |
| | | 701/38 |
| 2013/0341143 A1 * | 12/2013 | Brown .................... F16F 7/104 |
| | | 188/380 |
| 2014/0005888 A1 * | 1/2014 | Bose .................. B60G 17/0165 |
| | | 701/37 |
| 2014/0145498 A1 | 5/2014 | Yamakado et al. |
| 2014/0156143 A1 | 6/2014 | Evangelou et al. |
| 2014/0260233 A1 | 9/2014 | Giovanardi et al. |
| 2014/0312580 A1 | 10/2014 | Gale |
| 2014/0358378 A1 | 12/2014 | Howard et al. |
| 2014/0379215 A1 * | 12/2014 | Kikuchi ............... B60G 17/018 |
| | | 701/37 |
| 2015/0088378 A1 * | 3/2015 | Sugai .................. B60G 17/0182 |
| | | 701/37 |
| 2015/0123370 A1 | 5/2015 | Lee et al. |
| 2015/0197130 A1 | 7/2015 | Smith et al. |
| 2015/0224845 A1 | 8/2015 | Anderson et al. |
| 2015/0231942 A1 | 8/2015 | Trangbaek et al. |
| 2015/0343876 A1 | 12/2015 | Yoshizawa et al. |
| 2016/0003621 A1 | 1/2016 | Koenig et al. |
| 2016/0025176 A1 | 1/2016 | Kamakura et al. |
| 2016/0059658 A1 | 3/2016 | Kuriki |
| 2016/0096458 A1 | 4/2016 | Parker et al. |
| 2016/0159187 A1 | 6/2016 | Mohamed |
| 2016/0167743 A1 | 6/2016 | Melcher |
| 2016/0200164 A1 | 7/2016 | Tabata et al. |
| 2016/0215849 A1 | 7/2016 | Kurita |
| 2016/0291574 A1 | 10/2016 | Parison |
| 2016/0339823 A1 | 11/2016 | Smith et al. |
| 2016/0347143 A1 * | 12/2016 | Hrovat .................. B60W 50/14 |
| 2017/0047823 A1 | 2/2017 | Sangermano, III et al. |
| 2017/0100980 A1 * | 4/2017 | Tsuda ................ B60G 17/0165 |
| 2017/0129367 A1 | 5/2017 | Hein |
| 2017/0129371 A1 | 5/2017 | Knox |
| 2017/0129372 A1 | 5/2017 | Hein et al. |
| 2017/0129373 A1 | 5/2017 | Knox et al. |
| 2017/0137023 A1 | 5/2017 | Anderson et al. |
| 2017/0144501 A1 | 5/2017 | Wall |
| 2017/0203673 A1 | 7/2017 | Parker et al. |
| 2017/0240018 A1 * | 8/2017 | Mettrick ............ B60G 17/0182 |
| 2017/0241504 A1 | 8/2017 | Delorenzis et al. |
| 2017/0253101 A1 | 9/2017 | Kuriki |
| 2017/0253155 A1 | 9/2017 | Knox et al. |
| 2018/0015801 A1 * | 1/2018 | Mohamed ............... H04L 67/12 |
| 2018/0022178 A1 | 1/2018 | Xi |
| 2018/0029585 A1 | 2/2018 | Tanimoto |
| 2018/0056748 A1 | 3/2018 | Grimes |
| 2018/0065438 A1 | 3/2018 | Ogawa et al. |
| 2018/0079272 A1 * | 3/2018 | Aikin .................... G05D 1/0088 |
| 2018/0089901 A1 | 3/2018 | Rober et al. |

(56) References Cited

U.S. PATENT DOCUMENTS

| | | |
|---|---|---|
| 2018/0105082 A1 | 4/2018 | Knox |
| 2018/0126816 A1 | 5/2018 | Kondo et al. |
| 2018/0134111 A1* | 5/2018 | Toyohira ............. B60G 17/021 |
| 2018/0141543 A1 | 5/2018 | Krosschell et al. |
| 2018/0162186 A1 | 6/2018 | Anderson et al. |
| 2018/0162187 A1* | 6/2018 | Trangbaek ............. B60G 7/006 |
| 2018/0195570 A1 | 7/2018 | Churchill et al. |
| 2018/0208009 A1 | 7/2018 | McGuire et al. |
| 2018/0222274 A1 | 8/2018 | Davis et al. |
| 2018/0292543 A1 | 10/2018 | McFarland et al. |
| 2018/0297587 A1 | 10/2018 | Kasaiezadeh Mahabadi et al. |
| 2018/0345747 A1 | 12/2018 | Boon et al. |
| 2018/0370314 A1 | 12/2018 | Higle |
| 2018/0370318 A1 | 12/2018 | Maskell |
| 2019/0023094 A1* | 1/2019 | Panagis ................ B60G 17/019 |
| 2019/0118604 A1 | 4/2019 | Suplin et al. |
| 2019/0248203 A1 | 8/2019 | Krehmer et al. |
| 2019/0248364 A1 | 8/2019 | Dastgir et al. |
| 2019/0265064 A1 | 8/2019 | Koenig et al. |
| 2019/0308484 A1 | 10/2019 | Belter et al. |
| 2020/0088214 A1 | 3/2020 | Woodard et al. |
| 2020/0171907 A1 | 6/2020 | Hall et al. |
| 2020/0180386 A1 | 6/2020 | Tabata et al. |
| 2020/0216128 A1 | 7/2020 | Doerksen |
| 2021/0053487 A1 | 2/2021 | Vangelov et al. |
| 2021/0061046 A1 | 3/2021 | Simon et al. |
| 2022/0237866 A1 | 7/2022 | Stein et al. |
| 2023/0113306 A1 | 4/2023 | Broström et al. |
| 2023/0196230 A1 | 6/2023 | Cella et al. |

FOREIGN PATENT DOCUMENTS

| | | |
|---|---|---|
| DE | 19853876 A1 | 5/2000 |
| DE | 19850169 C1 | 7/2000 |
| DE | 102009060213 A1 | 6/2011 |
| DE | 102010041404 A1 | 3/2012 |
| DE | 202012002846 U1 | 7/2012 |
| DE | 102015003530 A1 | 9/2016 |
| DE | 102016000686 A1 | 7/2017 |
| DE | 102018208774 A1 | 12/2019 |
| DE | 102020121794 A1 | 2/2021 |
| EP | 1693233 B1 | 4/2009 |
| EP | 2072855 A1 | 6/2009 |
| EP | 2233330 B1 | 2/2013 |
| EP | 3088230 A1 | 11/2016 |
| GB | 2220625 A | 1/1990 |
| GB | 2437633 A | 10/2007 |
| JP | 2004155258 A | 6/2004 |
| JP | 2006200734 A | 8/2006 |
| JP | 2012002300 A | 1/2012 |
| JP | 2012167757 A | 9/2012 |
| JP | 2013244841 A | 12/2013 |
| JP | 5796315 B2 | 10/2015 |
| KR | 101509600 B1 | 4/2015 |
| KR | 20170095073 A | 8/2017 |
| WO | 9304883 A1 | 3/1993 |
| WO | 2011148792 A1 | 12/2011 |
| WO | 2012028228 A2 | 3/2012 |
| WO | 2014004118 A1 | 1/2014 |
| WO | 2014004119 A1 | 1/2014 |
| WO | 2014094934 A1 | 6/2014 |
| WO | 2015153811 A1 | 10/2015 |
| WO | 2015169530 A1 | 11/2015 |
| WO | 2016120044 A1 | 8/2016 |
| WO | 2017055151 A1 | 4/2017 |

OTHER PUBLICATIONS

Tenneco, "Integrated Kinetic, H2 Ces System, Ride Control Innovation, Accelerated", Rev. Sep. 2011, 4 pp.

porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www.porsche.com/usa/aboutporsche/pressreleases/pag/?pool=international-de&id-2011-01-10, 6 pp.

autoblog.com, "Porsche (finally) Unleashes Full, Official Details in 918 Spyder—Autoblog", Sep. 9, 2013, www.autoblog.com/2013/09/09/porsche-official-detials-918-spyder-frankfurt/, Downloaded Mar. 13, 2017, 26 pp.

press.porsche.com, "Introducing the Porsche 918 Spyder", Date Unknown, http://press.porsche.com/news/release.php?id-787, Downloaded Mar. 13, 2017, 7 pp.

Edren, Johannes, "Motion Modelling and Control Strategies of Over-Actuated Vehicles", Doctoral Thesis, Stockholm 2014 (56 pp).

Bolognesi, P., et al., "FEM Modeling and Analysis of a Novel Rotary-Linear Isotropic Brushless Machine", XIX International Conference of Electrical Machines—ICEM 2010, Rome (6 pp).

Xu, Lei, et. al., "Design and Analysis of a Double-Stator Linear-Rotary Permanent-Magnet Motor", IEEE Transactions on Applied Superconductivity, vol. 26, No. 4, Jun. 2016, (4 pp).

Sae International, "Michelin re-invents the wheel", Oct. 14, 2008, Downloaded Sep. 7, 2017, http://articles.sae.org/4604/ (2 pp).

daimler.com, "Suspension: The world's first suspension system with 'eyes'", https://media.daimler.com/marsMediaSite/en/instance/ko/Suspension-The-worlds-first-suspension-system-with-eyes.xhtml?oid=9904306, May 15, 2013 (6 pp).

youtube.com., KSSofficial, "Miniature Ball Screw With Ball Spline / English", Published on May 10, 2013, https://www.youtube.com/watch?v=vkcxmM0iC8U (2 pp).

Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).

Wikipedia, "Trailing-arm suspension", https://en.wikipedia.org/wiki/Trailing-arm_suspension, downloaded Sep. 3, 2019 (2 pp).

Cosford, J., "Is it a fair fight? Hydraulics vs. electrics", https://www.mobilehydraulictips.com/fair-fight-hydraulics-vs-electrics/, Mar. 28, 2014 (10 pp).

* cited by examiner

600

```
┌─────────────────────────────────────────────────────────────────────┐
│ Provide secondary ride control with a reaction mass actuator or a   │
│ tuned mass damper                                                   │
│                              610                                    │
└─────────────────────────────────────────────────────────────────────┘
                                  │
                                  ▼
┌─────────────────────────────────────────────────────────────────────┐
│ Provide additional secondary ride control with a primary actuator   │
│ when a capacity threshold is exceeded by the reaction mass actuator │
│ or the tuned mass damper                                            │
│                              620                                    │
└─────────────────────────────────────────────────────────────────────┘
                                  │
                                  ▼
┌─────────────────────────────────────────────────────────────────────┐
│ Change the capacity threshold according to a condition of the       │
│ environment ahead of the vehicle                                    │
│                              630                                    │
└─────────────────────────────────────────────────────────────────────┘
                                  │
                                  ▼
┌─────────────────────────────────────────────────────────────────────┐
│ Provide additional secondary ride control with the primary actuator │
│ when the changed capacity threshold is exceeded by the reaction     │
│ mass actuator                                                       │
│                              640                                    │
└─────────────────────────────────────────────────────────────────────┘
```

```
┌─────────────────────────────────────────────────────────────────────┐
│ Provide secondary ride control with a reaction mass actuator or a   │
│ tuned mass damper                                                   │
│                              610                                    │
└─────────────────────────────────────────────────────────────────────┘
                                  │
                                  ▼
┌─────────────────────────────────────────────────────────────────────┐
│ Provide secondary ride control with a primary actuator according    │
│ to a condition of the environment ahead of the vehicle              │
│                              611                                    │
└─────────────────────────────────────────────────────────────────────┘
```

```
┌─────────────────────────────────────────────────────────────────────────────┐
│ Determine a first suspension stiffness setting (e.g., a low or default stiffness setting) │
│                                      1510                                   │
└─────────────────────────────────────────────────────────────────────────────┘
                                      │
                                      ▼
┌─────────────────────────────────────────────────────────────────────────────┐
│ Operate the suspension system (e.g., the primary actuator ) according to the first │
│                         suspension stiffness setting                        │
│                                      1520                                   │
└─────────────────────────────────────────────────────────────────────────────┘
                                      │
                                      ▼
┌─────────────────────────────────────────────────────────────────────────────┐
│ Determine a second suspension stiffness setting (e.g., a high stiffness setting) │
│                according to road conditions ahead of the vehicle            │
│                                      1530                                   │
└─────────────────────────────────────────────────────────────────────────────┘
                                      │
                                      ▼
┌─────────────────────────────────────────────────────────────────────────────┐
│ Operate the suspension system (e.g., the primary actuator ) according to the second │
│                         suspension stiffness setting                        │
│                                      1540                                   │
└─────────────────────────────────────────────────────────────────────────────┘
```

FIG. 15

CONTROL SYSTEM

CROSS-REFERENCE TO RELATED APPLICATION(S)

This application is a continuation of U.S. patent application Ser. No. 16/567,482, filed Sep. 11, 2019, which claims priority to and the benefit of U.S. Provisional Patent Application No. 62/730,058, filed Sep. 12, 2018, the entire disclosures of which are incorporated by reference herein.

TECHNICAL FIELD

This disclosure relates to support systems and operation thereof.

BACKGROUND

Support systems have been developed by which a characteristic of the support may be controlled in response to a present condition.

SUMMARY

Disclosed herein are implementations of vehicles, suspension systems, control systems, and methods of controlling the vehicles. In one implementation, a vehicle includes a vehicle body, wheels, a suspension system that supports the wheels relative to the vehicle body, a drive system operatively coupled to two or more of the wheels for driving the vehicle, a sensing system for determining a roughness of a road surface ahead of the vehicle, and a control system that determines an operating speed according to the roughness, and operates the drive system to drive the vehicle at the operating speed over the road surface.

In one implementation, a vehicle includes a vehicle body, a wheel, a suspension system that supports the wheel relative to the vehicle body, a sensing system for determining an environmental condition ahead of the vehicle and a control system. The suspension system includes a primary actuator that transfers force between the wheel and the vehicle body, and a wheel hop damper that includes a moving mass and that transfers force between the wheel and the moving mass independent of the vehicle body to inhibit resonance of an unsprung mass formed by the wheel and a portion of the suspension system coupled thereto. The control system operates the primary actuator to provide additional secondary ride control when the wheel hop damper exceeds a capacity threshold. The control system changes the capacity threshold according to the environmental condition. The wheel hop damper may be a reaction mass actuator or a tuned mass damper.

In one implementation, a vehicle includes a vehicle body, wheels, a suspension system that supports the four wheels relative to the vehicle body, a sensing system for assessing an obstacle ahead of the vehicle, and a control system that operates the suspension to raise a ride height of the vehicle according to the obstacle for the obstacle to pass below the vehicle body and between two or more of the wheels.

In one implementation, a vehicle includes a vehicle body, four wheels that include two front wheels and two rear wheels, a suspension system that supports the wheel relative to the vehicle body, a steering system operatively coupled to two or more of the wheels for turning the vehicle, a sensing system for determining an environmental condition ahead of the vehicle, and a control system. The suspension system includes four actuators that are each operatively coupled to one of the four wheels to control force applied between the wheel and the vehicle body. The control system, according to the environmental condition, operates the steering system to turn the vehicle, and one of in advance of or concurrent with operating the steering system to turn the vehicle, operates the suspension system to transfer weight between the four wheels.

In one implementation, a vehicle includes a vehicle body, four wheels, a suspension system that supports the wheel relative to the vehicle body, a drive system operatively coupled to two or more of the wheels for driving the vehicle, a steering system operatively coupled to two or more of the wheels for turning the vehicle, a sensing system for assessing a disturbance in a road surface ahead of the vehicle, and a control system that, according to the disturbance and contemporaneous with one of the wheels traveling over the disturbance, operates the suspension system to mitigate vertical acceleration of the vehicle body, and operates one or both of the drive system or the steering system to mitigate horizontal acceleration of the vehicle body. In one implementation, a vehicle includes a vehicle body, four wheels that include two front wheels and two rear wheels, a suspension system that supports the wheels relative to the vehicle body, a sensing system for assessing an elevation change ahead of the vehicle, and a control system that, according to the elevation change, operates the suspension system to change a ride height of the vehicle prior to the vehicle reaching the elevation change.

In one implementation, a vehicle includes a vehicle body, wheels coupled to the body, a steering system operatively coupled to two or more of the wheels for turning the vehicle, a sensing system for assessing road disturbances of a road surface ahead of the vehicle, and a control system. The control system determines a coarse route plan by which the vehicle is to travel in a lane of a road section ahead of the vehicle, determines according to the assessing of the road disturbances a fine route plan by which the vehicle is to travel at lateral locations with the lane of the road section ahead of the vehicle, and operates the steering system to turn the vehicle according to the fine route plan over the road section.

In one implementation, a vehicle includes a vehicle body, wheels, a suspension system that supports the wheels relative to the vehicle body, a sensing system having a first sensor for sensing an environmental condition and a second sensor having a sensing capability that is affected by the environmental condition, and a control system that according to the environmental condition changes operation of the suspension system to improve the sensing capability of the second sensor.

In one implementation, a vehicle includes a vehicle body, wheels, a suspension system that supports the wheels relative to the vehicle body, a sensing system, and a control system. The sensing system includes a vehicle motion sensor that measures motion of the vehicle and a suspension system sensor that measures one or more of force or displacement of a suspension actuator of the suspension system. The control system records road disturbance information for a section of road with one or more of the vehicle motion sensor or the suspension system sensor, and controls the vehicle according to the road disturbance information when later travelling over the section of road.

In one implementation, a vehicle includes a vehicle body, a wheel, a suspension system, and a control system. The suspension system supports the vehicle body relative to the wheel. The suspension system includes a primary actuator that transfers force between the wheel and the vehicle body and is a ball screw actuator. The sensing system determines road conditions ahead of the vehicle. The control system operates the primary actuator with a first suspension stiffness setting and with a second suspension stiffness setting that are determined according to the road conditions ahead of the vehicle.

The first suspension stiffness setting may be a low stiffness and the second suspension stiffness setting is a high stiffness that is greater than the low stiffness. The control system may operate the primary actuator with the second suspension stiffness setting when the road conditions include an isolated road feature. The isolated road feature may be a pothole or a bump. The first suspension stiffness may be a default setting at which the control system predominantly operates the primary actuator. The control system may operate the primary actuator with the first suspension stiffness 50% or more of time. The first suspension stiffness setting and the second suspension stiffness setting may be gains.

In one implementation, a vehicle includes a vehicle body, a wheel, a suspension system, a sensing system, and a control system. The suspension system supports the vehicle body relative to the wheel, and includes a primary actuator that transfers force between the wheel and the vehicle body. The sensing system performs near-field sensing of a road surface relative to the vehicle. The control system that determines a feedforward road disturbance estimation according to the near-field sensing, determines suspension output with the feedforward road disturbance estimation, and operates the suspension system to provide the suspension output.

The near-field sensing may include one or more of observing the road surface in close proximity to the vehicle or sensing vertical wheel acceleration. The suspension output may include one or more of primary ride control or secondary ride control. The primary ride control includes active damping of inputs to the wheel occurring below 10 Hz. The secondary ride control is active damping at frequencies of other inputs to the wheel occurring near a natural frequency of an unsprung mass that includes the wheel. The control system may further the suspension output according to feedback from the suspension system.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 6A is a flow chart of a method for controlling secondary ride of the vehicle according to conditions ahead of the vehicle.

FIG. 6B is a flowchart of another method for controlling secondary ride of the vehicle.

FIG. 15 is a flow chart of a method for controlling stiffness of a suspension system.

DETAILED DESCRIPTION

Disclosed herein are vehicles having active suspension systems and other vehicle systems (e.g., drive and steering systems) that are operated according to conditions ahead of the vehicle. By accounting for conditions ahead of the vehicle, as opposed to only reacting to the road underneath the vehicle, various advantages may be afforded. One advantage may include improved ride comfort, for example, by allowing the vehicle to foresee and avoid combinations of road conditions and vehicle conditions (e.g., suspension conditions) that might otherwise induce undesirable behavior in the suspension system. Avoiding such combinations may also be advantageous by allowing the active suspension system to use more available capacity of the active suspension system (e.g., higher thresholds for suspension travel and/or force output), which as compared to a reactive suspension system may allow for greater overall capabilities and/or permit reduction in available capacity to achieve the same overall capabilities. This reduction of available capacity, such as reducing the travel, force, and/or bandwidth capabilities of suspension actuators, may be referred to as economizing. Still further advantages of accounting for conditions ahead of the vehicle include preparing the vehicle ahead of the road disturbance to better isolate the vehicle and performing maneuvers to avoid road disturbances. The vehicles, the suspension systems, and the methods disclosed herein may provide these and other advantages.

Figure 1A:
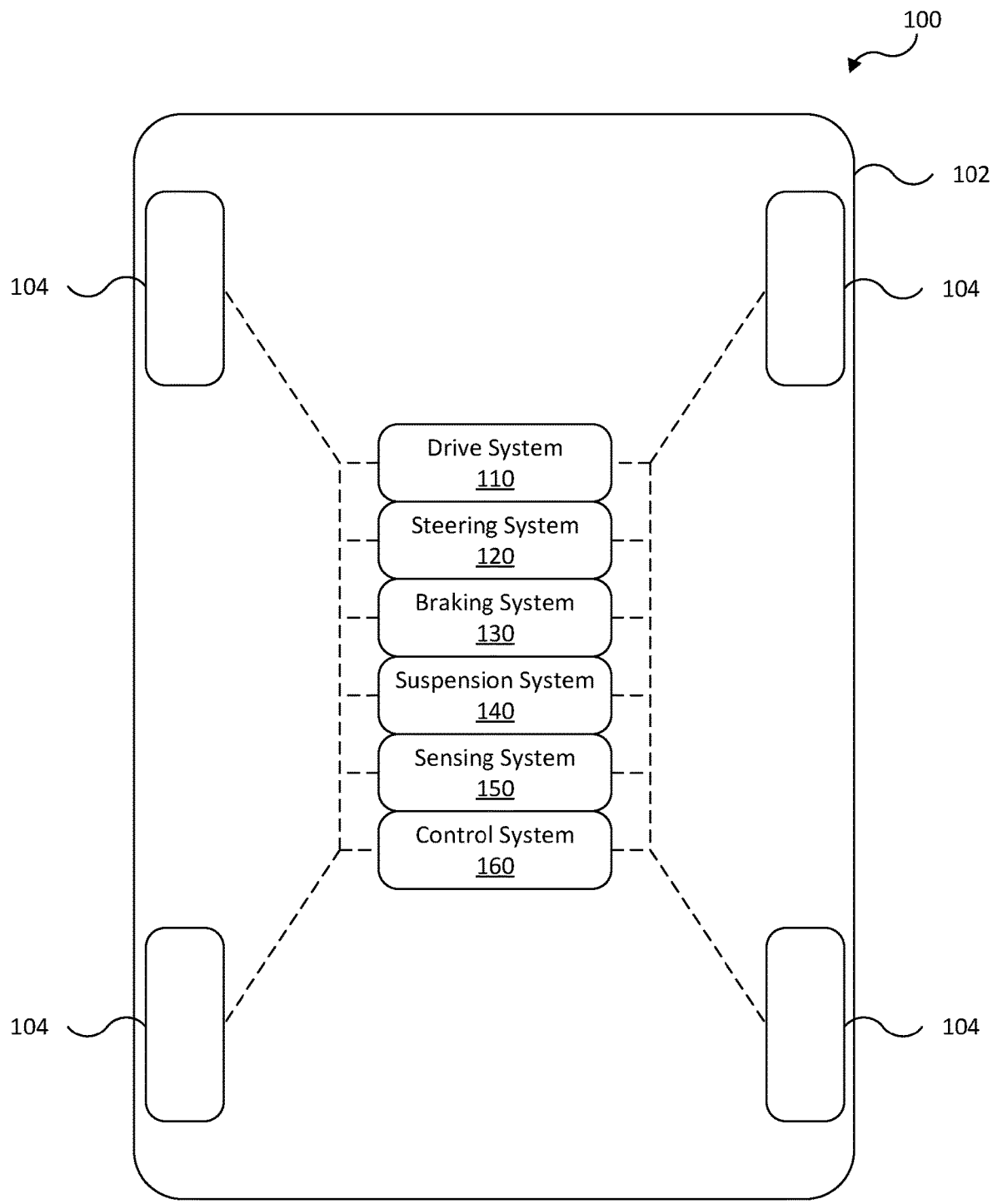
FIG. 1A is a schematic view of a vehicle.

Referring to FIG. 1A, a vehicle 100 includes a vehicle body 102 and wheels 104. The vehicle 100 also includes a drive system 110, a steering system 120, a braking system 130, a suspension system 140, a sensing system 150, and a control system 160, which are depicted schematically. The vehicle body 102, for example, includes a passenger compartment. The wheels 104 may include tires coupled thereto, which engage a surface over which the vehicle 100 travels (e.g., a road surface). The vehicle 100 may, for example, include four of the wheels 104 wheels, including two wheels at a front end of the vehicle 100 (i.e., two front wheels on a left side and a right side of the vehicle 100) and two wheels at a rear end of the vehicle (i.e., two rear wheels on the front side and the right side of the vehicle 100).

The drive system 110 is coupled to the wheels 104 to cause rotation thereof to accelerate and/or decelerate the vehicle 100 in a fore-aft direction. The drive system 110 may, for example, include an internal combustion engine, one or more electric motors, or both (e.g., a hybrid drive system), which are operatively coupled (e.g., via drive shafts) to two or more of the wheels 104 for transferring torque thereto for driving the wheels 104. The drive system 110 may also be referred to as a powertrain or a drivetrain.

The steering system 120 is operatively coupled to two or more of the wheels 104 to turn the wheels 104 (e.g., pivoting about a generally vertical axis) to cause lateral acceleration (e.g., turning left or right) of the vehicle 100. The steering system 120 includes one or more steering actuators, such as a rack and pinion actuator (e.g., a steering rack), that applies torque to two or more of the wheels 104 to pivot the wheels 104 about generally vertical axes. The steering system 120 may be capable of turning the wheels 104 independent of each in some circumstances, such as turning one of two front wheels 104 independent of the other of the two front wheels 104.

The braking system 130 is operatively coupled to the wheels 104 to decelerate the vehicle 100. The braking system 130 may, for example, include friction braking components (e.g., brake calipers and rotors associated with each of the wheels 104) that apply torque to the wheels 104 to hinder rotation thereof. Braking may also be provided by the drive system 110, for example, by the electric motor applying a counter torque to the wheels 104 (e.g., during regenerative braking).

The suspension system 140 is operatively coupled to each of the wheels 104 and to the vehicle body 102 to support the vehicle body 102 and the wheels 104 relative to each other (e.g., to control generally vertical displacement therebetween). The suspension system 140 is an active suspension system, which may be controlled in various manners to maintain contact between the wheels 104 and the ground (e.g., the road surface) for traction and/or to provide ride comfort to passengers of the vehicle 100. The suspension system 140 may also be referred to as a suspension and is discussed in further detail below. The term "active suspension," as used herein, includes suspension systems that are controllable to variably absorb energy and output energy, as well as suspension systems that are controllable to variably absorb energy but not output energy.

The sensing system 150 includes one or more sensors to monitor conditions of the vehicle 100, monitor conditions of the environment, and/or otherwise receive information about conditions of the environment. The sensing system 150 is discussed in further detail below.

The control system 160 is configured to control operation of the drive system 110, the steering system 120, the braking system 130 and/or the suspension system 140, for example, according to the conditions as assessed with the sensing system 150.

Figure 1B:
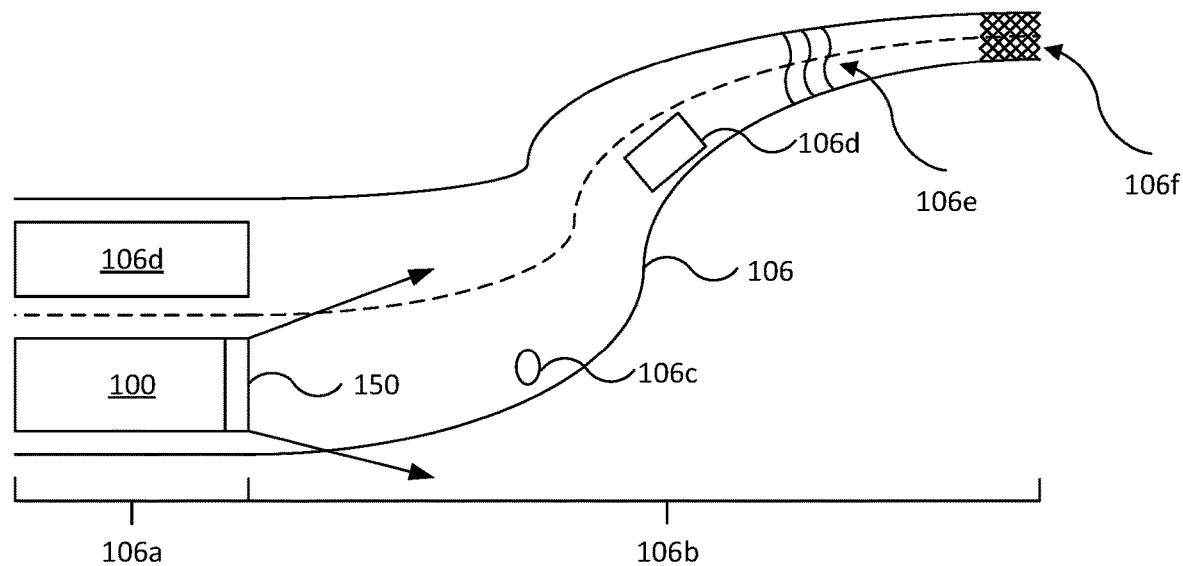
FIG. 1B is a schematic view of the vehicle of FIG. 1A on a road.

Referring to FIG. 1B, as the vehicle 100 travels along or over a road 106, a current road portion 106a is that portion of the road 106 over which the vehicle 100 is currently positioned (e.g., is engaging), while a forward road portion 106b is that portion of the road 106 ahead of the vehicle 100 over which the vehicle 100 is expected to travel. For example, the vehicle 100 may travel over the forward road portion 106b according to user inputs or a motion control plan (e.g., an autonomous drive plan that does not require continual input from a user). The road 106 may also include various features, including localized disturbances 106c (e.g., a pothole or bump), potential hazards 106d (e.g., vehicles ahead, vehicles traveling in the opposite direction, pedestrians, etc.), areas with different roughness 106e (e.g., washboard or smooth), and areas with different surface conditions 106f (e.g., wet, snow, icy, or dry), among other characteristics and features. The sensing system 150 observes the forward road portion 106b, such as with a field of view (schematically represented by forward pointing arrows) or otherwise determines information thereabout according to which the control system 160 operates the suspension system 140 and other systems of the vehicle 100.

Figure 2:
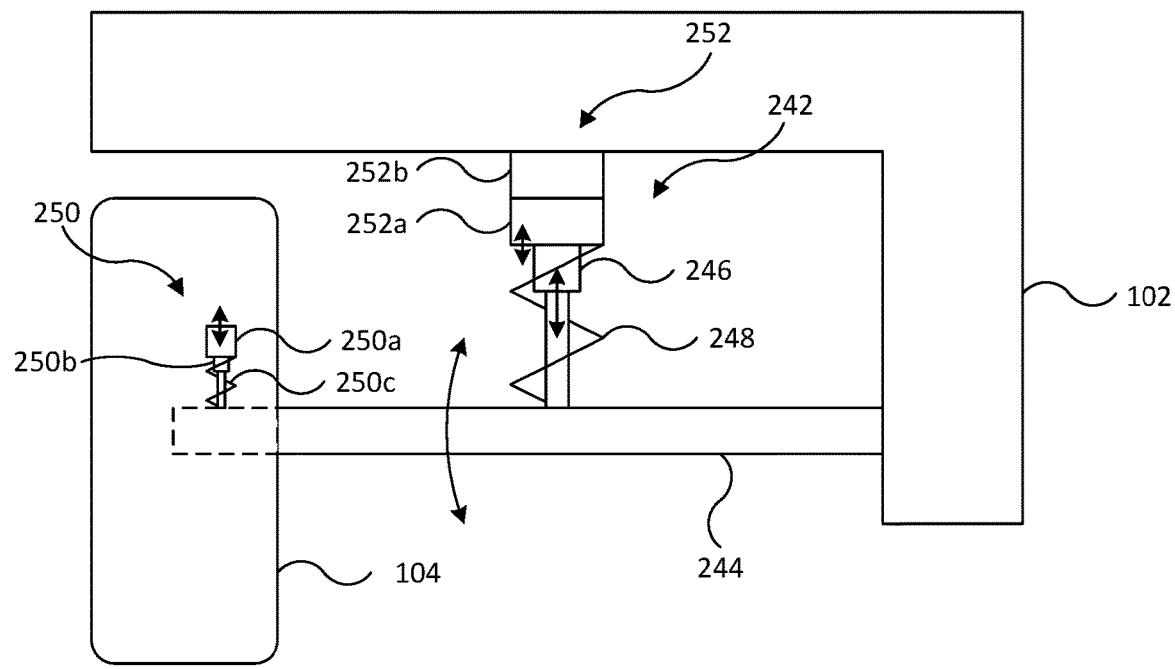
FIG. 2 is a partial view of a vehicle body and a suspension system of the vehicle.

Referring to FIG. 2, the suspension system 140 generally includes suspension actuator assemblies 242 that are each associated with one of the wheels 104 (e.g., four suspension actuator assemblies 242 for four wheels 104). Each of the suspension actuator assemblies 242 controls generally vertical motion of the wheel 104 associated therewith relative to the vehicle body 102. Each suspension actuator assembly 242 generally includes a suspension arm 244, a primary actuator 246, and a spring 248. The suspension arm 244 is pivotally coupled to and extends between the vehicle body 102 and the wheel 104 to allow the wheel 104 to move in a generally vertical path relative to the vehicle body 102.

The primary actuator 246 and the spring 248 are coupled to and extend between the vehicle body 102 and the suspension arm 244 to control movement of the wheel 104 in the generally vertical path. The primary actuator 246 and the spring 248 form parallel load paths between the vehicle body 102 and the suspension arm 244. The vehicle body 102 may be considered a sprung mass, while the wheel 104, the suspension arm 244, and other components that move therewith (e.g., portions or components of the braking system 120, the steering system 130, and/or the suspension system 140) may be considered an unsprung mass. The primary actuator 246 may, for example, be a ball screw actuator or other linear actuator capable of providing positive displacement (e.g., extension thereof). The spring 248 may, for example, be a coil spring or other type of spring (e.g., an air spring). While depicted schematically as coaxial and part of a common strut assembly, the primary actuator 246 and the spring 248 may instead be spaced apart, be provided as separate assemblies, or may be provided in another suitable manner. The primary actuator 246 provides primary ride control, which generally refers to active damping of road disturbances over a range of frequencies, which may include natural frequencies of the sprung mass and the unsprung mass, and is capable of outputting high force at high velocity between the vehicle body 102 and the suspension arm 244. For example, the primary ride control may operate in a low frequency range (e.g., below 10 Hz, such as 8 Hz and below, such as below a natural frequency of an unsprung mass that includes the wheel 104, as described below).

The suspension system 140 may also include reaction mass actuators 250, or other wheel hop damper, associated with each of the wheels 104 to provide secondary ride control (e.g., wheel hop control). The unsprung mass may have a natural frequency (e.g., between approximately 10 and 15 Hz) and may resonate when force is input by the road to the unsprung mass at such frequency. The natural frequency of the unsprung mass may be influenced, for example, by the mass, stiffness, and damping characteristics of the tire, the wheel 104, the suspension arm 244, and other components coupled thereto. Such resonance may be referred to as wheel hop and, absent damping of such forces, may result in the wheel 104 having reduced contact with the road surface.

The reaction mass actuator 250 provides secondary ride control, which generally refers to active damping of road inputs to an unsprung mass, which occur at frequencies near the natural frequency of the unsprung mass or that might otherwise induce resonance in the unsprung mass or wheel hop. For example, the reaction mass actuator 250 dampens the high frequency input forces from the road surface to the unsprung mass to increase contact and, thereby, maintain high friction (e.g., traction) between the wheel 104 and the road. The reaction mass actuator 250 is coupled to the unsprung mass, such as to the wheel 104 (e.g., to a wheel or steering hub), to the suspension arm 244, or to the suspension actuator assemblies 242. Advantageously, the reaction mass actuator 250 provides secondary ride control generally without or by reducing force transfer to the vehicle body 102, which might otherwise be felt by passengers of the vehicle 100.

The reaction mass actuator 250 includes, for example, a reaction mass 250a, a secondary actuator 250b (e.g., a secondary actuator), and a spring 250c, the secondary actuator 250b and the spring 250c being coupled to and extending between the unsprung mass and the reaction mass 250a to transfer force therebetween. The secondary actuator 250b applies force between the reaction mass 250a and the unsprung mass at the natural frequency to dampen force of the unsprung mass by moving the reaction mass 250a. The reaction mass actuator 250 may have a capacity, which is the ability to dampen forces of the unsprung mass (e.g., at the natural frequency thereof) and may be a function of the mass of the reaction mass 250a, the spring constant of the spring 250c, and/or the force and/or stroke distance of the secondary actuator 250b. The mass of the reaction mass 250a is sufficient to provide suitable damping at the natural frequency of the unsprung mass, which may be determined according to the mass of the unsprung mass among other considerations (e.g., overall vehicle mass). The reaction mass 250a may also be referred to as a moving mass.

The primary actuator 246 may also provide secondary ride control. For example, in the event or anticipation of the capacity of the reaction mass actuator 250 being exceeded, the primary actuator 246 may transfer force to the vehicle body 102, so as to maintain contact between the wheel 104 and the road surface and/or to prevent the reaction mass actuator 250 from reaching full stroke (e.g., bumping into end stops thereof). However, such force transfer to the vehicle body 102 may be felt by passengers thereof. As described in further detail below, the secondary ride control may be divided between the reaction mass actuator 250 and the primary actuator 246 according to road conditions ahead of the vehicle 100.

Instead of being configured as a reaction mass actuator 250, the wheel hop damper may instead be configured as a tuned mass damper. The tuned mass damper may have a similar configuration as the reaction mass actuator 250 with the secondary actuator 250b being replaced by a damper (e.g., a linear fluid damper, such as a shock absorber), such that the tuned mass damper includes a mass 250a (e.g., a moving mass), a damper 250b, and a spring 250c. The mass 250a, the damper 250b, and the spring 250c are cooperatively configured (e.g., tuned) to damp wheel hop (e.g., movement of the unsprung mass at the natural frequency).

The suspension system 140 may also include spring seat actuators 252 associated with each of the wheels 104. The spring seat actuators 252 includes a spring seat 252a and an actuator 252b. The spring seat 252a is movably coupled to the vehicle body 102, while the spring 248 extends between the spring seat 252a and the suspension arm 244 to cooperatively form a load path between the vehicle body 102 and the unsprung mass. The actuator 252b moves the spring seat 252a toward and away from the vehicle body 102, so as to reduce or increase ride height of the vehicle 100 and to transfer loading between the vehicle body 102 and the unsprung mass. The spring seat actuator 252 may be part of the suspension actuator assembly 242 and may, for example, be a ball screw actuator, a lead screw actuator, or a hydraulic actuator, among other types of actuators. The spring seat actuator 252 is capable of outputting high force, such as to support the vehicle 100 and change the ride height thereof, at a low velocity. As described in further detail below, the spring seat actuators 252 may be controlled according to road conditions ahead of the vehicle 100.

Figure 3:
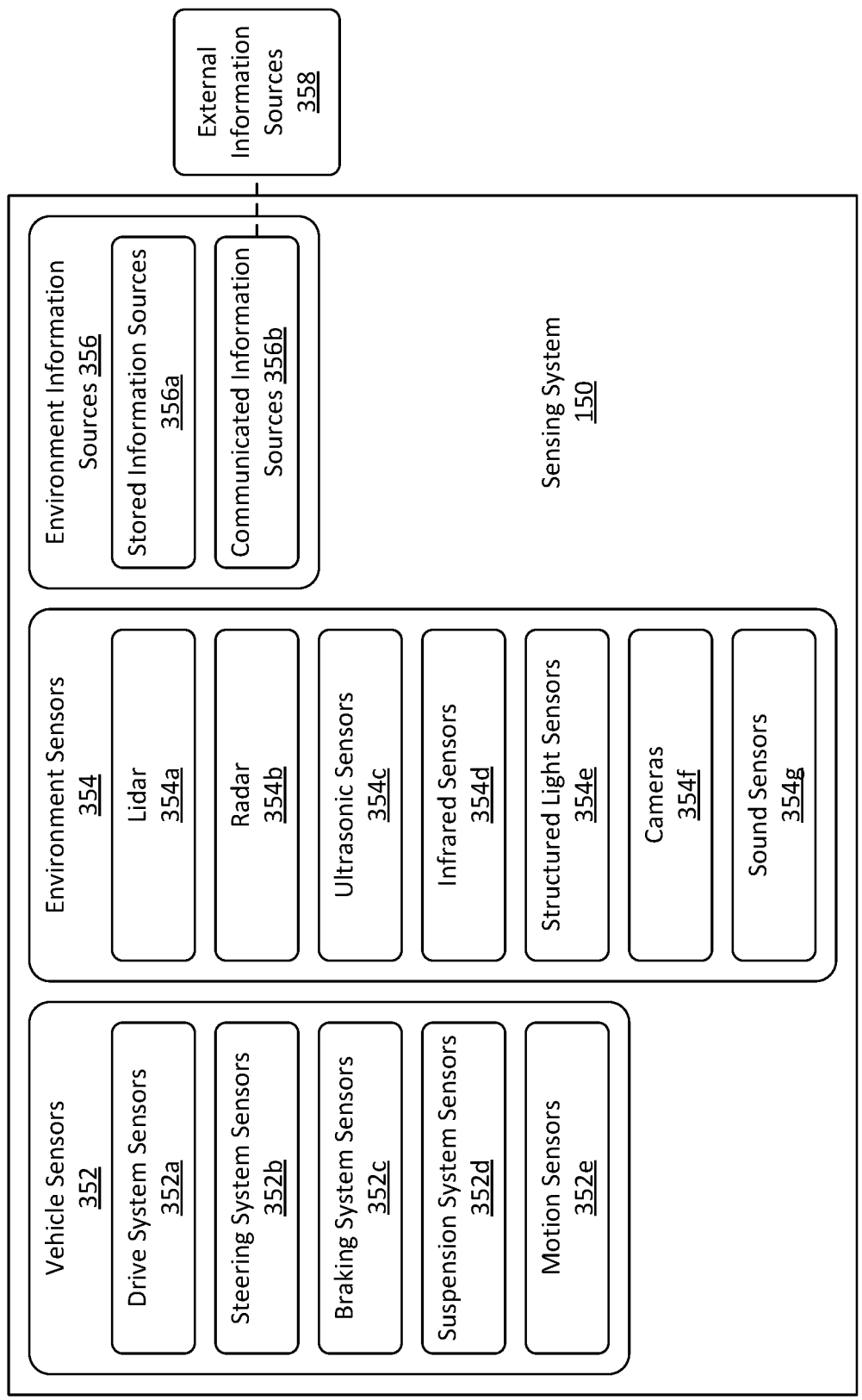
FIG. 3 is a schematic view of a sensing system of the vehicle.

Referring to FIG. 3, the sensing system 150 monitors conditions of the vehicle 100, monitors conditions of the environment of the vehicle, and/or receives, stores, or otherwise acquires condition information regarding the environment of the vehicle 100. The sensing system 150 includes vehicle sensors 352, which monitor conditions of the vehicle 100. For example, the vehicle sensors 352 may include drive system sensors 352a that measure various conditions of the drive system 110 (e.g., speed, torque, current, temperature of the drive components, such as electric motors, and the wheels 104), steering system sensors 352b that measure various conditions of the steering system 120 (e.g., steering angle of the wheels 104, position and/or force of the steering system components), braking system sensors 352c that measure various conditions of the braking system 130 (e.g., position, force, and/or temperature of the brake components), suspension system sensors 352d that measure various conditions of the suspension system 140 (e.g., force, motion/position, and temperature of the various actuators described above), and/or motion sensors 352e that measure motion and/or position information of the vehicle 100 (e.g., accelerometers, gyroscopes, magnetometers, inertial measurement unit (IMU), global positioning (GPS)).

The sensing system 150 also includes environment sensors 354 and environment information sources 356, which monitor, store, and/or receive information pertaining to conditions of the environment in which the vehicle 100 is operating. More particularly, the environment sensors 354 are generally configured to monitor or observe conditions of the environment ahead of the vehicle 100, which the vehicle 100 might encounter. The environment sensors 354 may, for example, include LIDAR sensors 354a (i.e., light detection and ranging sensors), radar sensors 354b, ultrasonic sensors 354c, infrared sensors 354d, structured light sensors 354e, cameras 354f, and/or sound sensors 354g. The environment sensors 354 may be used to detect, identify, and/or assess environment conditions using suitable methodologies and/or algorithms, such as with computer vision or object recognition techniques, that may be executed by the control system 160 (e.g., by controllers or processors thereof, as described below).

The environment information sources 356 may include stored information sources 356a, such as data storage components that store generally static or learned information, and communicated information sources 356b, such as wireless transceivers that receive transmitted environment condition information from external information sources 358 (e.g., other cars or infrastructure).

The environment information may include static information and dynamic information. Static information includes information that generally does not change or which changes slowly over time, such as road location, road elevation, road surface (e.g., material, roughness characterization, friction characterization), and road markers (e.g., markers, signs, stop lights, etc.). Dynamic information includes information that changes relatively quickly, such as weather conditions (e.g., snowing, raining, dry), road surface (e.g., roughness, friction), obstacles or disturbances (e.g., types, size, and/or location), traffic, and light changes.

Static information may be stored, received, and/or learned. For example, mapping information (e.g., road position, elevation, and surface) may be stored on the vehicle 100 (e.g., on a hard disk drive). Mapping information may be received and stored to update, supplement, and/or replace previously stored information (e.g., road additions/expansions, road information, such as road disturbances collected by the vehicle 100, other vehicles, or a service, such with the environment sensors 354 or motion sensors 352e). Dynamic information may be sensed by the environment sensors 354 and/or received from the external information sources 358, such as other vehicles (e.g., vehicle-to-vehicle communication, such as road conditions and obstacles), infrastructure (e.g., vehicle-to-infrastructure communication), and other sources (e.g., weather data information).

The control system 160 is in communication with and configured to control the various other systems of the vehicle 100, such as the drive system 110, the steering system 120, the braking system 130, the suspension system 140, and/or the sensing system 150, for example, according to the vehicle and environment conditions. Such communication is represented schematically by the dashed lines shown in FIG. 1.

Figure 4A:
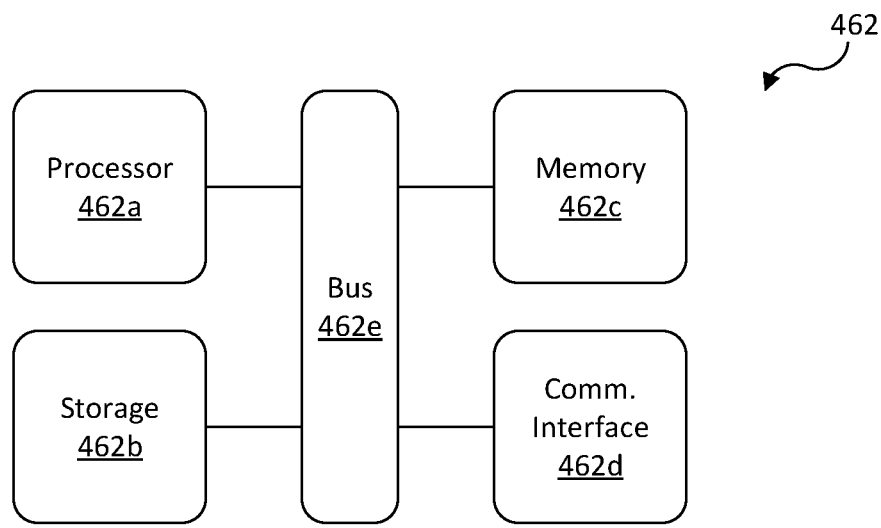
FIG. 4A is a schematic view of a hardware configuration of controller of a control system of the vehicle.

Referring to FIG. 4A, the control system 160 may include one or more controllers 462, which may have a hardware configuration as shown. The controller 462 generally includes a processor 462a, a storage 462b, a memory 462c, and a communications interface 462d that are in communication via a bus 462e. The processor 462a is operable to execute computer program instructions and perform operations described thereby. The processor may, for example, be a central processing unit (CPU) or other conventional processing device. The storage 462b is a long-term information storage device, such as a hard or solid-state drive, or other non-volatile information storage device. The storage 462b, for example, stores the computer program instructions (e.g., software code or code segments). The memory 462c may be a short-term information storage device, such as a random-access memory module (RAM) or other volatile, high-speed, short-term storage device. The communications interface 462d is an input/output (I/O) device that provides for the receipt and/or sending of signals to and/or from the controller 462, which may include information signals and/or instructions signals that are processed or generated by the processor 462a according to the computer program instructions in the storage 462b.

Figure 4B:
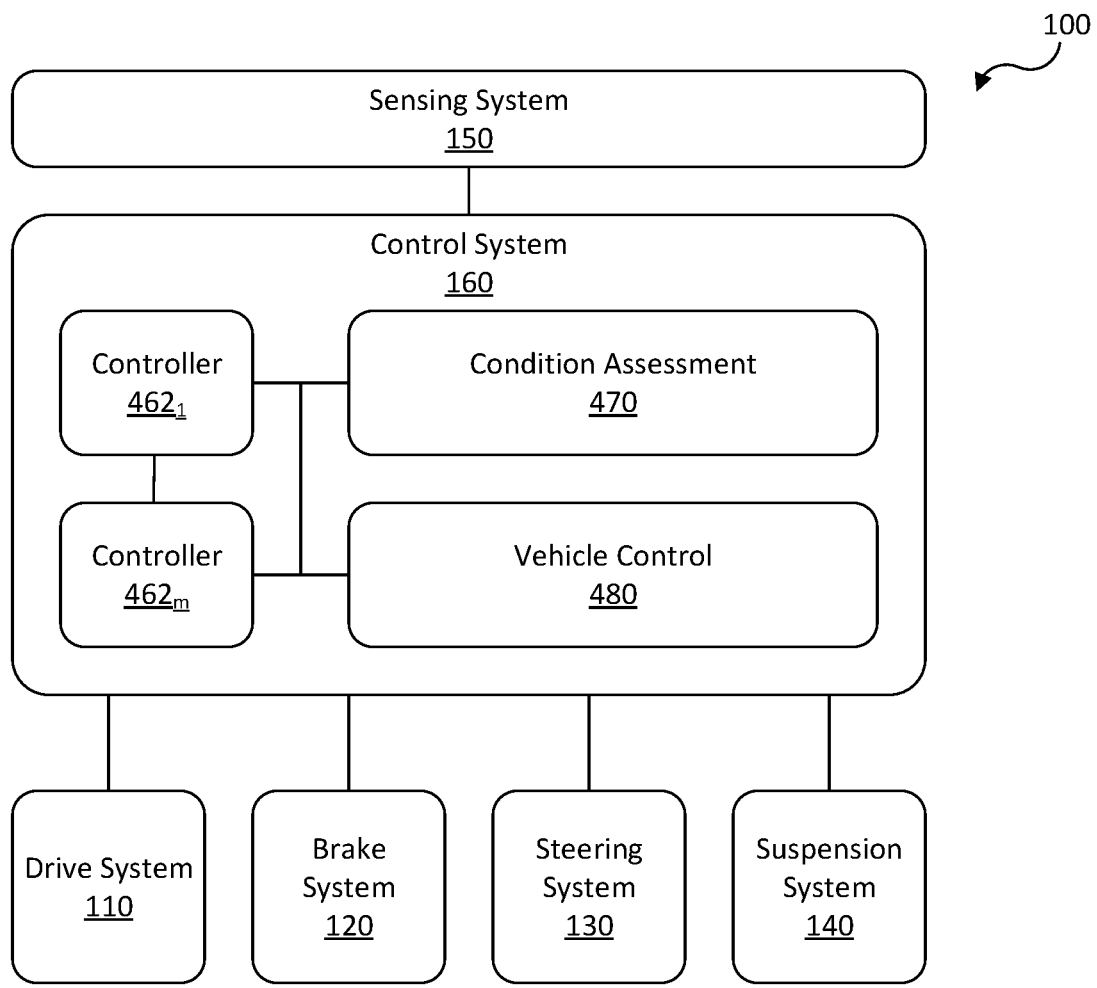
FIG. 4B is a schematic view of the vehicle.

Referring to FIG. 4B, the one or more controllers 4621-*m* of the control system 160 may be associated with one or more of the systems 110, 120, 130, 140, 150 described above and/or controllable components thereof (e.g., motors and/or actuators). The control system 160 is in communication with the sensor system 150 (e.g., the sensors thereof) and the various output systems (e.g., the drive, brake, steering, and suspension systems 110, 120, 130, 140). The control system 160 executes computer program instructions that generally include a condition assessment unit 470 and a vehicle control unit 480, which may be provided as a program stored and executed by a single controller 462 or multiple different controllers 462. The condition assessment unit 470 may generally receive sensing signals from the sensing system 150 (e.g., the vehicle sensors 352, the environment sensors 354, and the information sources 356), process the sensing signals, and output a condition variable or signal. The vehicle control unit 480 may generally receive the condition signal or variable, process the condition signal or variable to determine vehicle control instructions, and operate the various output systems and components of the vehicle 100 according to the vehicle control instructions (e.g., the suspension system 140 and the primary actuators 246 thereof).

Referring to FIGS. 5-16, the suspension system 140 is controlled and/or other systems of the vehicle 100 are controlled according to environmental conditions ahead of the vehicle 100 and/or according to conditions or characteristics of the suspension system 140. The methods and various operations thereof may be performed by any suitable combination of one of more of the controllers 4621-*m* of the control system 160, for example, by the processor(s) thereof executing software programming (e.g., code) stored thereby.

Figure 5:
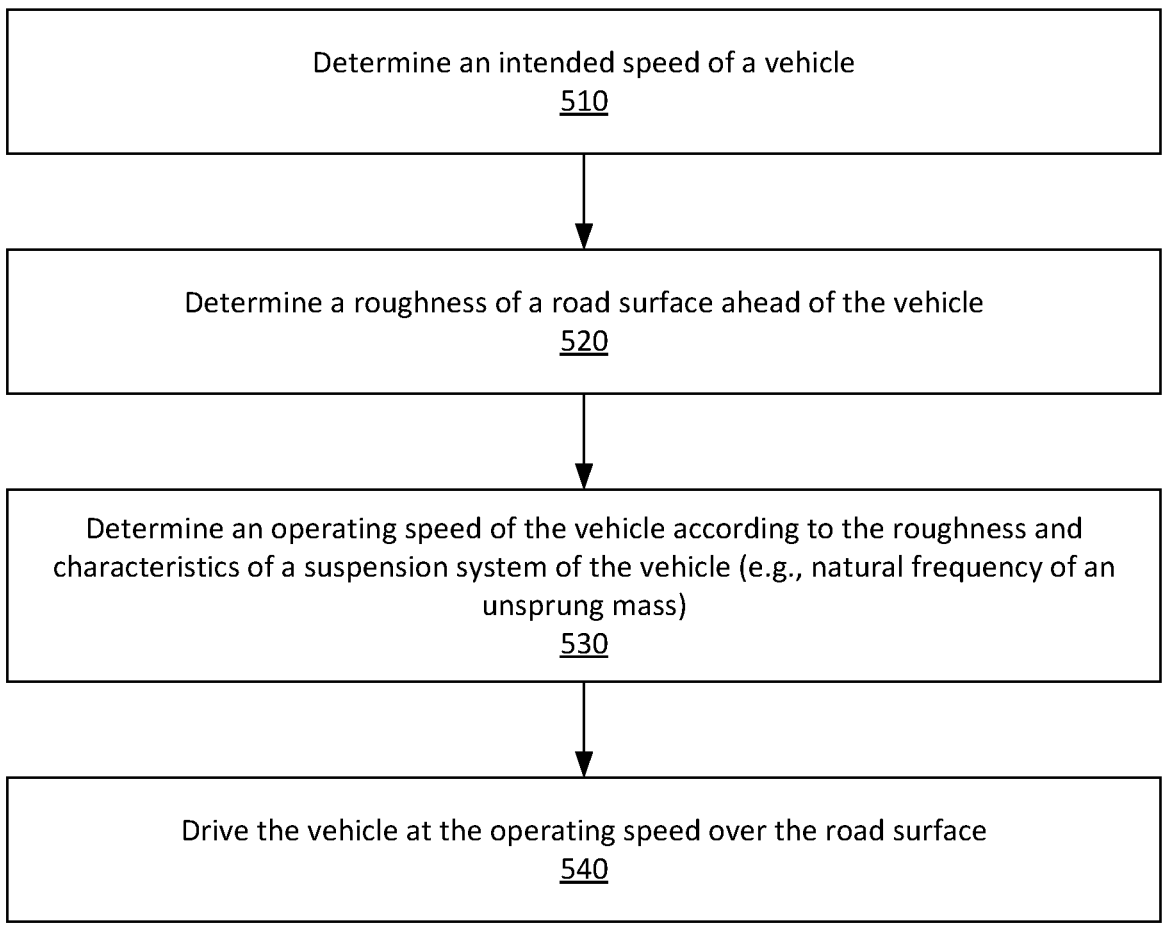
FIG. 5 is a flow chart of a method for controlling a vehicle according to roughness of a road surface ahead of the vehicle.

Referring to FIG. 5, the vehicle 100 is controlled according to roughness of the road ahead of the vehicle 100. The sensing system 150 may determine the road surface ahead of the vehicle 100 to have a roughness, which may cause wheel hop (e.g., induce resonance) in the unsprung mass associated with one or more of the wheels 104. The vehicle 100 is controlled according to the roughness, for example, to reduce occurrence of (e.g., prevent or inhibit) resonance in the unsprung mass.

The roughness may be defined with a general characterization (e.g., smooth, brick or cobblestone, dirt or washboard) or a specific characterization, such as a period or frequency (e.g., corresponding to the distance between cyclical road disturbances, such as with a segmented road surface (e.g., brick or cobblestone) or with otherwise textured surfaces (e.g., washboard dirt road)). The roughness may be determined with the vehicle sensors 352 (e.g., motion of front wheels 104 used to control the suspension system 140 for the rear wheels 104), environment sensors 354 (e.g., LIDAR, cameras) using computer vision to assess the road surface ahead of the vehicle 100, environment information sources 356 (e.g., receiving roughness information from another vehicle traveling ahead of the vehicle 100), or combinations thereof (e.g., using the vehicle sensors 352 to determine a position of the vehicle (e.g., GPS coordinates), which is correlated to stored information pertaining to the roughness (e.g., mapping information learned from previous travel of the vehicle 100, other vehicles, or other sources)).

In one example, the speed of the vehicle 100 may be controlled according to the roughness of the road surface. Resonance of the unsprung may be expected to be more likely to occur when the vehicle 100 is driven at certain speeds (e.g., a small range of speeds) over the road surface having a certain roughness (e.g., having a general roughness characterization or having a specific roughness characterization, as described above). At such speeds in such conditions, the wheel hop damper (e.g., the reaction mass actuator 250 or the tuned mass damper) may have insufficient capacity to dampen such road input forces arising from the roughness. Accordingly, the vehicle 100 is operated at a different speed (e.g., faster or slower) than that at which resonance of the unsprung might be expected, such that force inputs to the unsprung mass from the road surface occur at a frequency other than that natural frequency of the unsprung mass. As a result, the speed of the vehicle 100 may be controlled according to both the roughness of the road surface and the natural frequency of the unsprung mass.

Instead or additionally, the speed of the vehicle 100 may be controlled to prevent disturbances at other frequencies, which may be bothersome to passengers of the vehicle 100. Such other frequencies may, for example, include other natural frequencies at which resonance might occur for other portions of the vehicle 100, such as the sprung mass (e.g., as a whole having a lower natural frequency, such as below approximately 5 Hz), the vehicle body 102, brake components or assemblies (e.g., brake caliper, brake rotor, or both), steering components or assemblies (e.g., a steering knuckle, a steering actuator), drive components (e.g., a motor or gearbox), suspension components (e.g., of the suspension arm 244, the actuator assembly 242), and/or components or items in the vehicle body 102 (e.g., seats, passengers (e.g., to prevent head wobble), screens, controls (e.g., steering wheel or accelerator pedal). As a result, the speed of the vehicle 100 may be controlled according to both the roughness of the road surface and the natural frequency of the sprung mass, the vehicle body, or other components or assemblies of the vehicle 100.

As shown in FIG. 5, a method 500 is provided for controlling a vehicle 100 according to roughness of the road surface ahead of the vehicle 100. The method 500 includes a first operation 510 of determining an intended speed of the vehicle 100, a second operation 520 of determining a roughness of a road surface ahead of the vehicle, a third operation 530 of determining an operating speed according to the roughness and characteristics of the vehicle 100, such as the suspension system 140, and a fourth operation 540 of operating the vehicle 100 at the operating speed.

The first operation 510 of determining an intended speed of the vehicle 100 may, for example, be performed by the control system 160. The intended speed may be based on an input from the user or be a speed of a motion control plan (e.g., an autonomous drive plan), for example, based on the speed limit of the road ahead.

The second operation 520 of determining roughness of a road surface may be performed by the control system 160 in conjunction with the sensing system 150. For example, the roughness may be determined by using the environment sensors 354 observing the road surface (e.g., identifying, measuring, or otherwise detecting disturbances in the road surface) and/or behavior of other vehicles ahead of the vehicle 100. Roughness may instead or additionally be determined by using the vehicle sensors 352 in conjunction with stored information sources 356a (e.g., correlating GPS coordinates to mapping information that includes road surface roughness information). The roughness may be defined by a general characterization based on the type of road surface (e.g., a category, such as smooth, washboard, brick, cobblestone, segmented) or a specific characterization based on observed characteristics of the road surface (e.g., the period of cyclical disturbances in the road surface).

The third operation 530 of determining an operating speed may be performed by the control system 160. The operating speed is determined according to roughness of the road surface (i.e., as determined in the second operation 520) and characteristics of the vehicle 100, such as a natural frequency of the suspension system 140 (e.g., of the unsprung mass formed thereby). The operating speed may instead or additionally be determined according to other characteristics of the vehicle 100 (e.g., natural frequencies of various other components or assemblies, such as the sprung mass, the vehicle body 102, and/or other components or assemblies).

For example, certain combinations of vehicle speed and roughness may be expected to induce undesirable suspension conditions, such as resonance or wheel hop in the unsprung masses (e.g., that include one or more of the wheels 104). The operating speed is determined to be a speed at which such undesirable suspension conditions are not expected to occur as a result of the roughness.

The operating speed may, for example, be determined according to the intended speed and the roughness with a lookup table that accounts for the suspension characteristics. The operating speed may be the intended speed (e.g., if the undesirable suspension conditions are not likely to occur), or a different speed (e.g., higher or lower to achieve a different input frequency from the road surface to the unsprung mass). Alternatively, the operating speed may be determined according to formulae that account for the suspension characteristics and that use the intended speed and the roughness as inputs. Thus, whether using a lookup table or formulae, the operating speed is determined according to the roughness of the road ahead of the vehicle 100 and characteristics of the suspension system 140.

The third operation 530 may instead be divided into a first suboperation of determining whether the undesirable suspension conditions are likely to occur at the intended speed, and a second suboperation of determining the operating speed to be different than the intended speed if undesirable suspension conditions are first determined to be expected or likely at the intended speed.

The fourth operation 540 of operating the vehicle 100 at the operating speed is performed by the drive system 110. For example, the control system 160 causes the drive system 110 to drive the vehicle 100 at the second speed over the road surface determined to have the roughness.

Referring to FIG. 6A, the primary actuator 246 is controlled according to characteristics of the wheel hop damper (e.g., the reaction mass actuator 250 or the tuned mass damper) and conditions ahead of the vehicle 100. As described above, the reaction mass actuator 250 or the tuned mass damper provides secondary ride control, for example, to prevent wheel hop. As referenced above, the secondary ride control (i.e., dampening of high frequency road inputs to prevent resonance or wheel hop) may be allocated to (e.g., actively provided by) the reaction mass actuator 250, which dampens road inputs by transferring force to the reaction mass 250a, and to the primary actuator 246, which dampens high frequency road inputs by transferring force to the vehicle body 102. Based on the conditions ahead of the vehicle 100, the secondary ride control may be allocated to the primary actuator 246 earlier (e.g., at a lower threshold) or later (e.g., at higher threshold) than in other conditions. As described above, the tuned mass damper may instead passively damp wheel hop (i.e., resonance of the unsprung mass). In such case, based on the conditions ahead of the vehicle 100, the secondary ride control may be allocated to the primary actuator 246 earlier (e.g., at a lower threshold) or later (e.g., at higher threshold) than in other conditions. By providing the secondary ride control with the primary actuator 246 at a lower threshold, the tuned mass damper may be prevented from reaching its damping capacity.

For example, in typical operation, secondary ride control may be provided by the reaction mass actuator 250, or the tuned mass damper may passively damp movement of the unsprung mass at the natural frequency thereof. When a capacity threshold is exceeded by the reaction mass actuator 250 or the tuned mass damper, additional secondary ride control is provided the primary actuator 246 (e.g., concurrent with the secondary ride control being provided by the reaction mass actuator 250, or the tuned mass damper providing passive damping). The capacity threshold may, for example, be a percentage of the overall capacity of the reaction mass actuator 250, such as a percentage of the stroke distance of the reaction mass actuator 250, or other suitable parameter (e.g., force, frequency, and/or stroke distance). The capacity threshold may function to reserve capacity of the reaction mass actuator 250, for example, if further damping is required to maintain traction and/or to limit circumstances in which the full capacity of the reaction mass actuator 250 is utilized. Reaching full capacity of the reaction mass actuator 250 may be undesirable, because when the reaction mass 250a reaches travel limits (e.g., impacting end stops thereof), sharp forces may be transferred to the unsprung mass and, ultimately, to the vehicle body 102. Similarly, the capacity threshold of the tuned mass damper may be a percentage of the overall capacity of the tuned mass damper, such as a percentage of a stroke distance of the mass or other suitable parameter (e.g., acceleration of the mass). Reaching full capacity of the tuned mass damper may be undesirable, because when the mass reaches travel limits (e.g., impacting end stops thereof), sharp forces may be transferred to the unsprung mass and, ultimately, to the vehicle body 102.

Based on environmental conditions, secondary ride control may instead be provided by the primary actuator 246 later than during typical operation, for example, by changing (i.e., increasing) the capacity threshold of the wheel hop damper (e.g., the reaction mass actuator, or the tuned mass damper). The capacity threshold may be increased, for example, when high traction for turning or braking is less likely to be required (e.g., on a straight road and/or few potential obstacles). By increasing the capacity threshold, the primary actuator 246 may be used to provide secondary ride control in fewer instances and/or with lower force transfer to the vehicle body 102, such that ride quality is improved and passengers of the vehicle 100 are less disturbed by such force transfer. In other circumstances, the capacity threshold may be decreased, such that the primary actuator 246 provides secondary ride control in more instances and/or with more force transfer.

As referenced above, the capacity threshold may be increased when environmental conditions ahead of the vehicle 100 are less likely to require high traction and/or acceleration (e.g., deceleration and/or lateral acceleration) of the vehicle 100. Such conditions may, for example, include road direction (e.g., presence and/or severity of curves ahead), presence of potential obstacles (e.g., number and/or distance to surrounding vehicles), road friction conditions (e.g., dry, wet, or snow covered), and/or confidence in such conditions (e.g., ability to observe the environment ahead and/or whether stored or received information is available for the environment ahead). In specific examples, the capacity threshold may be increased when the road ahead is determined to be straight and/or when potential obstacles (e.g., people or objects, such as vehicles, that are or may become obstacles in a path of the vehicle 100) are not present.

As shown in FIG. 6A, a method 600 is provided for controlling secondary ride with the primary actuator 246 according to environmental conditions ahead of the vehicle. The method 600 includes a first operation 610 of providing secondary ride control with a wheel hop damper (e.g., actively with a reaction mass actuator, or passively with a tuned mass damper), a second operation 620 of providing additional secondary ride control with a primary actuator when a capacity threshold is exceeded by the wheel hop damper, a third operation 630 of changing the capacity threshold according to environmental conditions ahead of the vehicle 100, and a fourth operation 640 of providing additional secondary ride control with the primary actuator when the changed capacity threshold is exceeded by the reaction mass actuator.

The first operation 610 of providing secondary ride control is performed by the wheel hop damper (e.g., actively by the reaction mass actuator 250 as operated by the control system 160, or passively by the tuned mass damper) associated with one or more of the wheels 104. With reaction mass actuator 250, the secondary actuator 250b applies force between the reaction mass 250a and the unsprung mass (e.g., formed by the wheel 104 and the suspension arm 244) to counter high frequency road inputs to the unsprung mass, which might otherwise induce resonance of the unsprung mass or wheel hop. With the tuned mass damper, force is transferred passively between the mass 250a by the damper and the spring.

The second operation 620 of providing additional secondary ride control is performed with the primary actuator 246 and may be operated by the control system 160 and the suspension system sensors 352d (e.g., measuring displacement and/or acceleration of the moving mass of the wheel hop damper). For example, the control system 160 may determine that the capacity threshold (e.g., a first capacity threshold, such as a percentage of a stroke distance, acceleration, or force value) is exceeded by the reaction mass actuator 250 or the tuned mass damper associated with the wheel 104. If exceeded, the control system 160 may, accordingly, cause the primary actuator 246 apply force between the unsprung mass and vehicle body 102 to further counter high frequency road inputs to the unsprung mass, which might other otherwise induce resonance of the unsprung mass or wheel hop. The initial capacity threshold may, for example, be a default value normally used by the vehicle 100.

The third operation 630 of changing the capacity threshold according to environmental conditions ahead of the vehicle 100 is performed using the sensing system 150 and the control system 160. For example, the sensing system 150 may observe or otherwise determine environmental conditions ahead of the vehicle 100, which may include road direction, presence of potential obstacles, and/or road friction conditions. Obstacles, such as surrounding vehicles, may be observed with the environment sensors 354 (e.g., LIDAR, radar, and/or cameras) or be determined with external sources (e.g., other vehicles). Road direction and/or road friction conditions may be observed with the environment sensors 354 (e.g., LIDAR, radar, and/or cameras). Road direction and/or road friction conditions may be observed with the environment sensors 354 and/or be determined by stored or received mapping information that is correlated with the position of the vehicle 100 determined with the motion sensor 352e (e.g., GPS coordinates).

Upon detecting environmental conditions that are less likely to require high traction for accelerating the vehicle 100 (e.g., straight road, no presence or limited number of potential obstacles, and/or high friction road surface), the capacity threshold is changed from the initial capacity threshold to a higher capacity threshold. Conversely, when detecting environmental conditions that are more likely to require high traction for acceleration the vehicle (e.g., curvy road, many potential obstacles, and/or low friction road surface), the capacity threshold may be changed from the initial capacity threshold to a lower capacity threshold.

For example, the capacity threshold may be changed in a binary manner upon detection such conditions (e.g., moving from 80% to 90%), or may be changed according to a lookup table according to the environmental condition.

The third operation 630 of changing the capacity threshold according to environmental conditions may be performed in multiple suboperations, for example, including first determining whether environmental conditions exist that warrant a change of the capacity threshold, and subsequently determining a changed capacity threshold only upon detecting environmental conditions that warrant such a change.

The fourth operation 640 of providing additional secondary ride control is performed with the primary actuator 246 as operated, for example, by the control system 160 and the suspension system sensors 352d. For example, the control system 160 may determine that the changed capacity threshold is exceeded (e.g., a second capacity threshold) by measuring displacement and/or acceleration of the moving mass with the suspension system sensors 352d for comparison with the changed capacity threshold, and accordingly provide the additional secondary ride control with the primary actuator 246.

It should be noted that the first operation 610 of providing secondary ride control with the reaction mass actuator 250 may be performed simultaneous with each of the second, third, and fourth operations 620, 630, 640.

Furthermore, the method 600 may be performed in conjunction with the method 500. For example, the speed of the vehicle 100 may be changed according to roughness of the road ahead of the vehicle 100, while the capacity threshold may be changed according to whether environmental conditions are more likely to require accelerating the vehicle 100.

Referring to FIG. 6B, instead of or in addition to adjusting the capacity threshold of the reaction mass actuator 250 or tuned mass damper, the secondary ride control provided by the primary actuator 246 may be increased (e.g., preemptively) according to a condition of the environment ahead (e.g., a bump, pothole, or other large input), irrespective of the capacity threshold of the reaction mass actuator 250 or the tuned mass damper. For example, based on the condition ahead (e.g., rough road expected to induce wheel hop), the secondary ride control provided by the primary actuator 246 may be increased, thereby reducing the eventual damping demand on the reaction mass actuator 250 or the tuned mass damper, regardless of whether the capacity threshold thereof (adjusted or not according to the method 600) is exceeded. Providing secondary ride control with the primary actuator 246 irrespective of whether the capacity threshold is exceeded by the reaction mass actuator 250 or the tuned mass damper may provide a particular benefit for environmental conditions (e.g., road conditions) that are isolated and/or have large force transfer to the wheel 104 (e.g., the localized disturbance 106c, such as a pothole or large bump). Other or additional benefit may be achieved more predictably and/or gradually increasing force transfer from the primary actuator 246 to the vehicle body 102 to provide the secondary ride control in direct response to the environmental condition ahead as opposed to, possibly suddenly, beginning such force transfer when exceeding the capacity threshold of the reaction mass actuator 250 or the tuned mass damper.

As shown, a method 601 is a variation of the method 600 and provides for increasing the secondary ride control of the primary actuator 246 according to the condition of the environment ahead. The method 601 generally includes the first operation 610 (described above), and a second operation 611 of providing additional secondary ride control with a primary actuator according to environmental conditions ahead of the vehicle 100. The second operation 611 is performed generally as described above with respect to the operation 630 (e.g., using the sensing system 150), but rather than changing the capacity threshold according to which the secondary ride control may or may not be provided by the primary actuator 246, secondary ride control is provided by the primary actuator 246 according to the environmental condition irrespective of whether the capacity threshold is met. As referenced above, the environmental condition may be an isolated, high magnitude road feature (e.g., a pothole or bump) as opposed to continuous, repeated, and/or low magnitude feature (e.g., a washboard road). For example, the secondary ride control may be provided by the primary actuator 246 in advance of predicted to either require high force output or power consumption from the reaction mass actuator or to cause the tuned mass damper reach its actual capacity, regardless of the capacity threshold.

Figure 6C:
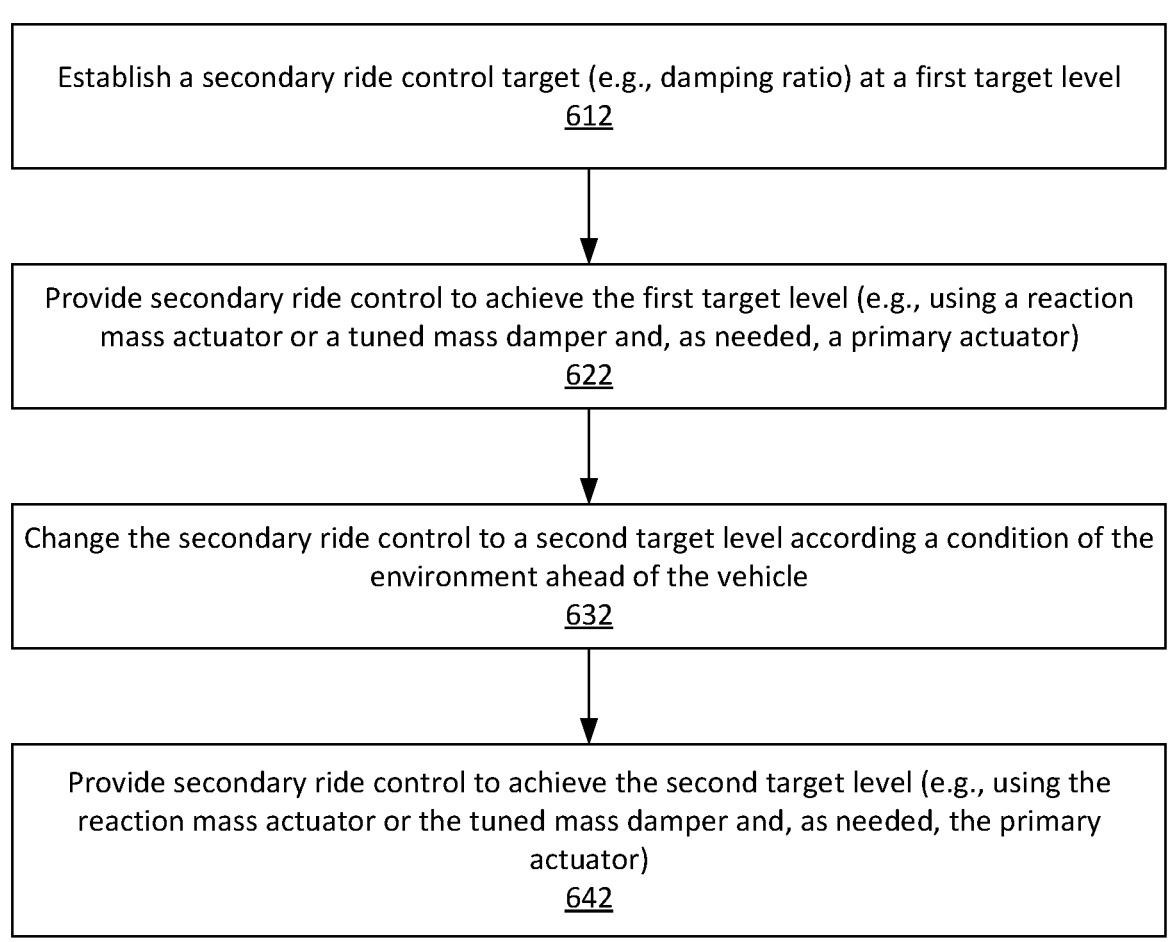
FIG. 6C is a flowchart of another method for controlling secondary of the vehicle.

The method 601 may be performed in conjunction with the method 600, for example, with the second operation 611 being performed in parallel to the second operation 620 of providing the secondary ride control with the primary actuator 246 when the capacity threshold is met. In such an arrangement, the secondary ride control may be provided by the primary actuator 246 based either directly on the environmental condition ahead (i.e., the method 601) or the capacity threshold (adjusted or not) being exceeded (i.e., the method 600). Referring to FIG. 6C, instead of or in addition to changing the capacity threshold of the reaction mass actuator 250 or the tuned mass damper or increasing the secondary ride control provided by the primary actuator 246, an overall level of secondary ride control to be achieved is adjusted according to the environmental condition ahead of the vehicle 100. This overall level of secondary ride control, which is provided individually or cooperatively by the reaction mass actuator 250, the tuned mass damper, and/or the primary actuator 246, is referred to herein as a secondary ride control target and may be adjusted to different target levels. The secondary ride control target may be a damping ratio. For those environmental conditions in which greater traction may be required (e.g., twisting road, gravel road, twisting gravel road, and/or high traffic), the secondary ride control target may be increased (e.g., at a high level). For those environmental conditions in which lesser traction may be required (e.g., straight road, paved road, and/or low traffic), the secondary ride control target may be lowered (e.g., at a low level as compared to the high level). One benefit of adjusting the secondary ride control target is that energy consumption of the suspension system 140 may be reduced when providing secondary ride control at lower levels.

As shown in FIG. 6C, a method 602 is provided for adjusting secondary ride control target according to the environment ahead of the vehicle 100. The method 602 includes a first operation 612 of establishing a secondary ride control target at a first target level, a second operation 622 of providing secondary ride control to achieve the first target, a third operation 632 of adjusting the secondary ride control target to a second target level according to environmental conditions ahead of the vehicle, and a fourth operation 642 of providing the secondary ride control to achieve the second target level.

The first operation 612 of establishing the secondary ride control target at the first target level includes establishing (e.g., setting or prescribing) a target amount of secondary ride control that is to be achieved (e.g., targeted or reached). The secondary ride control target may be a damping ratio for one or more of the mass-spring systems formed of one of the wheels 104 and portions of the suspension assembly 242 (e.g., also including the reaction mass actuator 250). In one example, the first target level provides a high level of traction (e.g., for maximum traction with the wheel 104) and may be adjusted downward (e.g., only downward) if reduced levels of traction are desired. In another example, the first target level provides middle level of traction and may be adjusted upward or downward if higher or lower levels of traction are desired.

The second operation 622 of providing the secondary ride control to achieve the first target level is performed by providing all or a portion of the secondary ride control with the reaction mass actuator 250 or the tuned mass damper and additionally (if necessary) with the primary actuator 246. For example, the primary actuator 246 may provide additional secondary ride control if the capacity threshold for the reaction mass actuator 250 or the tuned mass damper is exceeded.

The third operation 632 of adjusting the secondary ride control target to a second target level according to the environmental conditions is performed similar to the first operation 630 described previously for changing the capacity threshold in the method 600. For example, the sensing system 150 may observe or otherwise determine environmental conditions ahead of the vehicle 100, which may include road direction, presence of potential obstacles, and/or road friction conditions. Upon detecting environmental conditions that are less likely to require high traction for accelerating the vehicle 100 (e.g., straight road, no presence or limited number of potential obstacles, and/or high friction road surface), the secondary ride control target is changed to a second target level that is lower than the first target level (e.g., the damping ratio is decreased). Conversely, when detecting environmental conditions that are more likely to require high traction for acceleration the vehicle (e.g., curvy road, many potential obstacles, and/or low friction road surface), the secondary ride control target is changed to a second target level that is higher than the first target level (e.g., the damping ratio is increased).

The fourth operation 642 of providing the secondary ride control to achieve the second target level is performed by providing all or a portion of the secondary ride control with the reaction mass actuator 250 or the tuned mass damper and additionally (if necessary) with the primary actuator 246. For example, the primary actuator 246 may provide additional secondary ride control if the capacity threshold for the reaction mass actuator 250 or the tuned mass damper is exceeded.

The method 602 may be performed in conjunction with the method 600, such that the capacity threshold used in one or both the second operation 622 and the fourth operation 642 may be adjusted according to the environmental conditions ahead of the vehicle 100. The method 602 may, instead or additionally, be performed in conjunction with the method 601.

Figure 7:
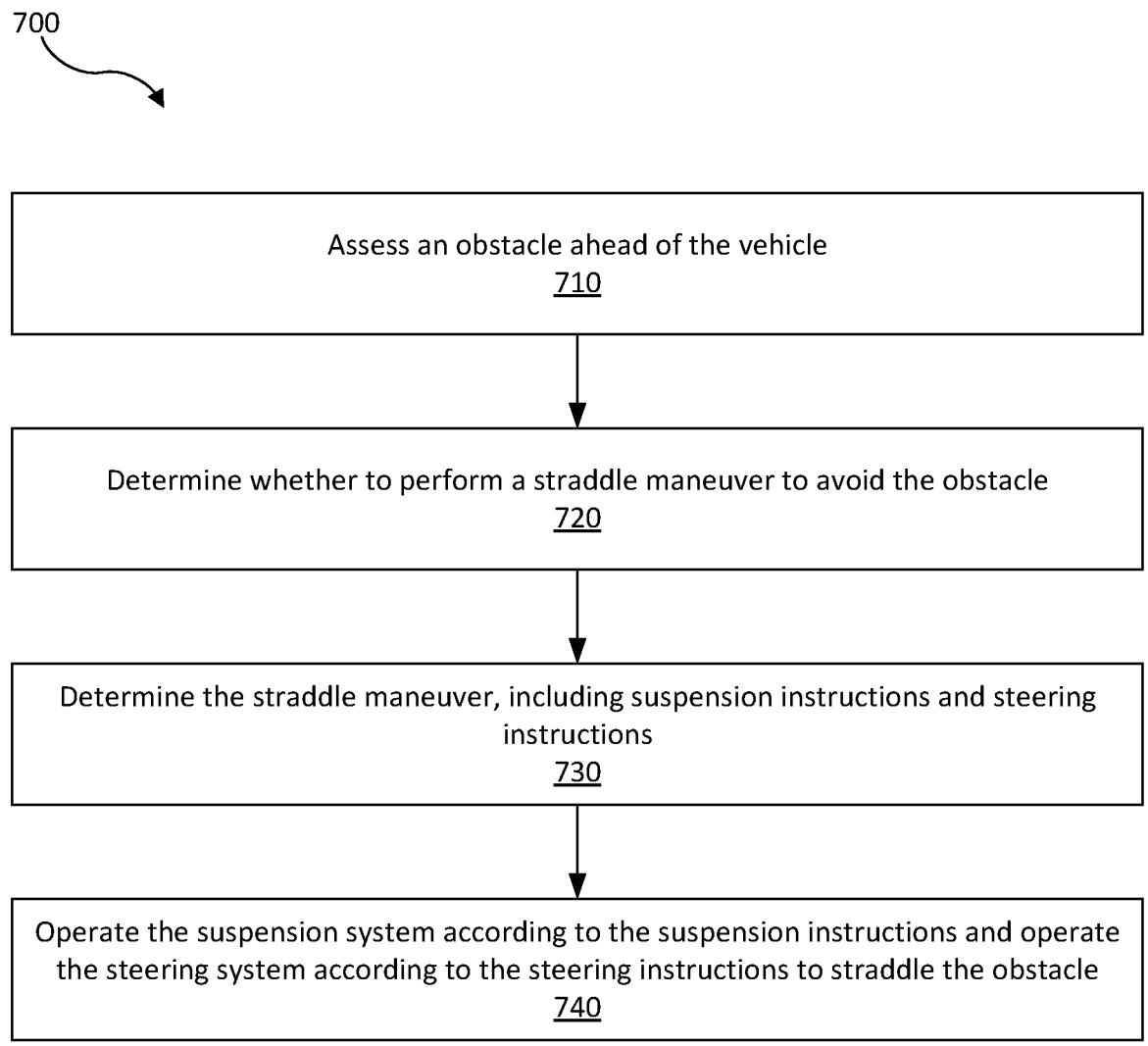
FIG. 7 is a flow chart of a method for controlling the vehicle for obstacle avoidance.

Referring to FIG. 7, the suspension system 140 may be operated according to assessment of an obstacle ahead of the vehicle 100. The vehicle 100 may detect the obstacle in the road ahead and both raise the vehicle 100 (e.g., increase a ride height of the vehicle 100) and steer the vehicle 100, such that the vehicle 100 straddles the obstacle between the wheels 104 thereof.

The vehicle 100 may observe the road ahead with the environment sensors 354 to assess (e.g., detect and/or characterize). For example, LIDAR, radar, and/or cameras may be used in conjunction with the control system 160 to identify an obstacle and assess an obstacle, for example, by characterizing a size of the obstacle (e.g., by height, width, and/or predicted motion). Based on the assessment of the obstacle, the vehicle 100 determines an appropriate maneuver to avoid the obstacle, which may be referred to as an obstacle avoidance maneuver. The obstacle avoidance maneuver may include steering and increasing a ride height of the vehicle 100 for the obstacle to pass under the vehicle body 102 and between two or more wheels 104 of the vehicle 100, which may be referred to as a straddle maneuver. The obstacle avoidance maneuver may instead include steering the vehicle 100 around the obstacle and/or stopping the vehicle 100 before the obstacle, which may be referred to as a swerving maneuver and a stopping maneuver, respectively.

As shown in FIG. 7, a method 700 is provided for obstacle avoidance. The method 700 includes a first operation 710 of assessing an obstacle ahead of the vehicle, a second operation 720 of determining whether to perform a straddle maneuver, a third operation 730 of determining suspension instructions and steering instructions of the straddle maneuver, and a fourth operation 740 of operating the suspension system 140 according to the suspension instruction and the steering system 120 according to the steering instruction to straddle the obstacle with the vehicle 100.

The first operation 710 of assessing an obstacle may be performed with the sensing system 150 (e.g., the environment sensors 354 and/or the environment information sources 356), for example, in conjunction with the control system 160. The sensing system 150, with the environment sensors 354, may observe the environment ahead of the vehicle 100 (e.g., the road ahead of the vehicle), such as with one or more of LIDAR, radar, sonar, and/or cameras, which are in communication with the control system 160. The environment information sources 356 may include another vehicle, which previously identified an obstacle, or another source (e.g., mapping data).

In assessing an obstacle, obstacle characteristics are determined by which a suitable obstacle avoidance maneuver may be determined. The obstacle characteristics include information suitable to determine whether the vehicle 100 is capable of performing the straddle maneuver to avoid the obstacle, which may include characterizing a size of the obstacle (e.g., a height and a width of the obstacle) or other suitable characteristics (e.g., characterizing the obstacle by size category, such as small, large, short, long, narrow, and/or wide). The obstacle characteristics may further include predicting motion of the obstacle such that a predicted location of the obstacle may be determined.

The second operation 720 of determining whether to perform the straddle maneuver is performed, for example, by the control system 160. The control system 160 may, for example, compare the obstacle characteristics to vehicle characteristics (e.g., fixed and/or dynamic characteristics) to determine whether the straddle maneuver may be performed. For example, the obstacle characteristics (e.g., height, width, size, and/or motion) may be compared to thresholds that correspond to fixed characteristics of the vehicle 100 (e.g., distance between wheels 104 and maximum ride height of the vehicle 100) and/or to dynamic characteristics of the vehicle 100 (e.g., maximum available ride height achievable at given speed of the vehicle 100 and suspension requirements).

Determining whether to perform the straddle maneuver may also include assessing other obstacle avoidance maneuvers, such as whether the swerving maneuver and/or the braking maneuver may be performed to avoid the obstacle (e.g., based on braking distance, cornering ability, presence of other obstacles, such as other vehicles). For example, the straddle maneuver may be preferable over the swerve maneuver if less disturbance to passengers of the vehicle 100 or to surrounding vehicles is expected.

The third operation 730 of determining the straddle maneuver includes determining maneuver instructions, including determining a suspension instruction (e.g., to raise the vehicle body 102 to pass above the obstacle) and determining a steering instruction (e.g., sequence of steering angles) according to a predicted position of the obstacle (e.g., to steer the vehicle 100 for the obstacle to pass between the wheels 104 on left and right sides thereof). Maneuver instructions may also include braking instructions, for example, to slow the vehicle 100 sufficiently to allow the suspension height and/or steering inputs to be achieved prior to the vehicle 100 reaching the obstacle.

The fourth operation 740 of operating the suspension system and the steering system is, for example, controlled by the control system 160 according to the suspension instruction and the steering instruction. For example, for one or more wheels 104 (e.g., all four wheels 104), the primary actuator 246 and/or the spring seat actuator 252 may raise the vehicle body 102 relative to the road surface. The steering system 120 may also change the steering angle of the wheels 104 to guide the obstacle between two or more of the wheels 104 and/or the braking system 130 may slow rotation of the wheels 104.

Figure 8:
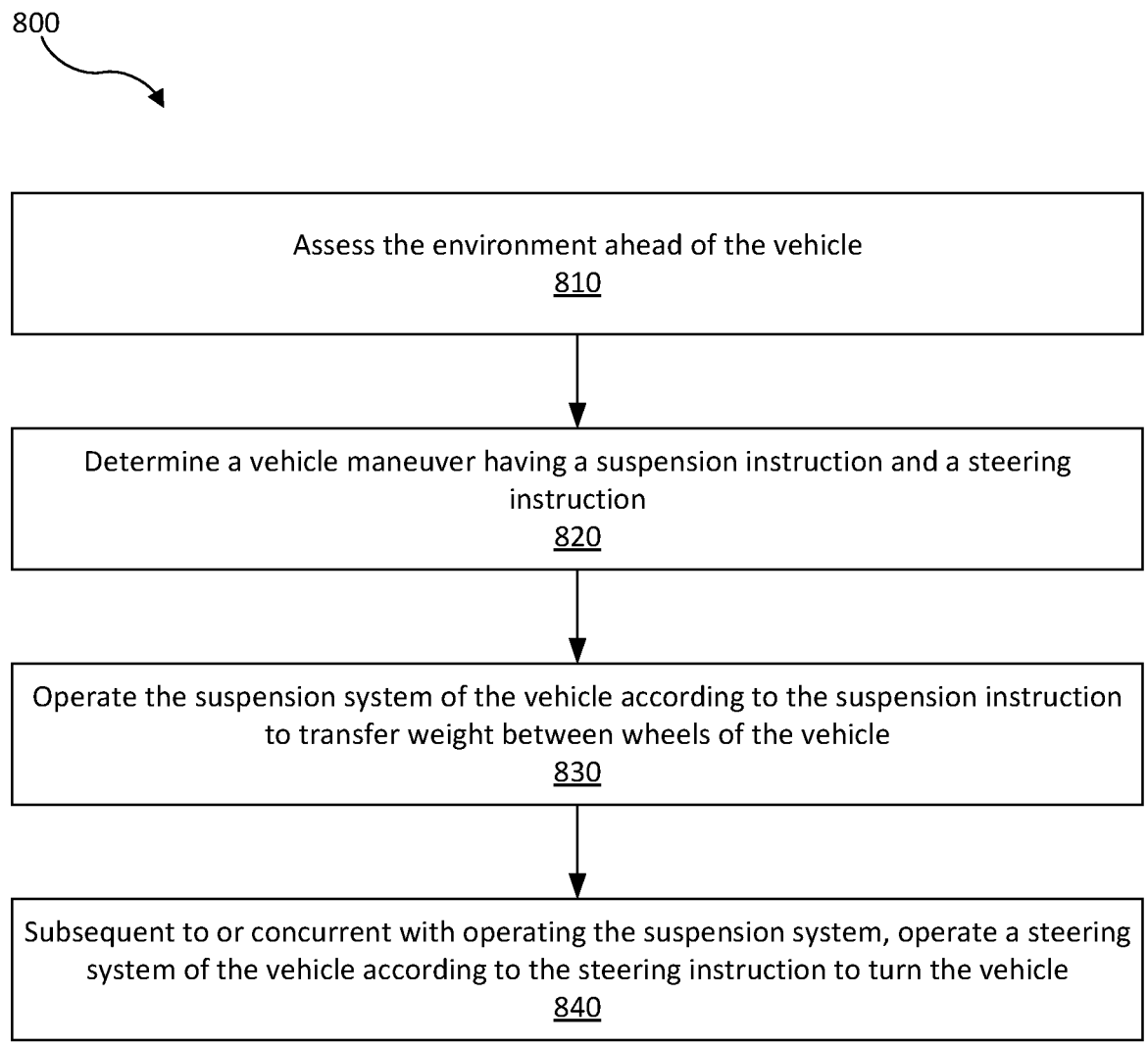
FIG. 8 is a flow chart of a method for controlling the vehicle to perform a steering maneuver.

Referring to FIG. 8, the suspension system 140 is controlled according to environmental conditions ahead of the vehicle 100 to assist a steering maneuver. Based on conditions ahead of the vehicle 100, a steering maneuver may be determined by which the steering system 120 is operated to turn the vehicle 100 and the suspension system 140 transfers load between the wheels 104 to assist turning of the vehicle 100. For example, the environmental condition may be presence of an obstacle, which may be assessed by observing the road ahead of the vehicle 100 and/or by correlating a position of the vehicle 100 to stored information (e.g., mapping data that includes environmental information, including obstacle information, such as obstacle locations). In case of an obstacle being present, the steering maneuver may be to steer around the obstacle. In one example, the steering maneuver is an oversteer maneuver in which the vehicle 100 turns by a greater amount than would be expected of the vehicle 100 at low speed with the same steering angles of the wheels 104. In advance of and/or concurrent with turning the wheels 104 with the steering system 120, the suspension system 140 is operated to transfer weight from the rear wheels 104 to the front wheels 104, which in combination with turning the wheels 104 (e.g., the front wheels) with the steering system 120, induces oversteer. For example, the suspension system 140 may pitch the vehicle 100 forward, such as by operating the primary actuators 246 to accelerate a rear of the vehicle 100 upward (e.g., by increasing force between the rear wheels 104 and the vehicle body 102) and/or a front of the vehicle 100 downward (e.g., by decreasing force between the front wheels 104 and the vehicle body 102). In another example, weight may be transferred between the front wheels 104 (e.g., left to right) and the rear wheels 104 in an opposite direction (e.g., right to left) to induce warp.

As shown in FIG. 8, a method 800 is provided for assisting a steering maneuver with the suspension system 140. The method 800 includes a first operation 810 of assessing the environment ahead of the vehicle 100, a second operation 820 determining a vehicle maneuver according to the environment ahead of the vehicle 100, a third operation 830 operating the suspension system 140 according to the suspension instruction of the vehicle maneuver, and a fourth operation 840 operating the steering system 120 according to the steering instruction of the vehicle maneuver subsequent to or concurrent with operating the suspension system 140.

The first operation 810 of assessing the environment ahead of the vehicle 100 may be performed by the sensing system 150 in conjunction with the control system 160. For example, the sensing system 150 may observe the environment ahead of the vehicle 100 with the environment sensors 354 thereof, such as by observing the road (e.g., changes in direction and/or elevation) and/or potential obstacles. Instead or additionally, the environment may be assessed using stored environment information (e.g., map data correlated with a position and path of the vehicle 100 determined with the motion sensors 352e) or received information (e.g., from vehicles ahead).

The second operation 820 of determining a vehicle maneuver according to the environment ahead of the vehicle is performed, for example, with the control system 160. The vehicle maneuver may, for example, include following the road ahead (e.g., according to an autonomous drive plan) or avoiding an obstacle. The vehicle maneuver includes a suspension instruction and a steering instruction. For example, the vehicle maneuver may be an oversteer maneuver in which the suspension instruction includes operating the primary actuators 246 to transfer weight to the front wheels 104, while the steering instruction includes turning the front wheels 104 by an amount less than normally required (e.g., in slow speed conditions) to achieve the desired amount of steering. The facilitate the oversteer maneuver, the suspension instruction may be configured to pitch the vehicle body 102 forward, for example, by operating the primary actuators 246 coupled to the rear wheels 104 to upwardly accelerate the rear of the vehicle 100 and/or by operating the primary actuators 246 coupled to the front wheels 104 to downwardly accelerate the front of the vehicle 100.

The third operation 830 of operating the suspension system 140 is controlled, for example, by the control system 160 according to the suspension instruction of the vehicle maneuver determined in the second operation 820. For example, the control system 160 may operate the suspension system 140 according to the suspension instruction to transfer weight between the wheels 104, such as to increase the load of the front wheels 104, in the manners described above.

The fourth operation 840 of operating the steering system 120 is controlled, for example, by the control system 160 according to the steering instruction of the vehicle maneuver determined in the second operation 820. The fourth operation 840 may be performed subsequent to and/or concurrent with the third operation 830 of operating the suspension system 140, such that the front wheels 104 experience increased loading (e.g., increased force between the wheels 104 and the road surface) while the front wheels 104 are turned according to the steering instruction to turn the vehicle 100.

Figure 9:
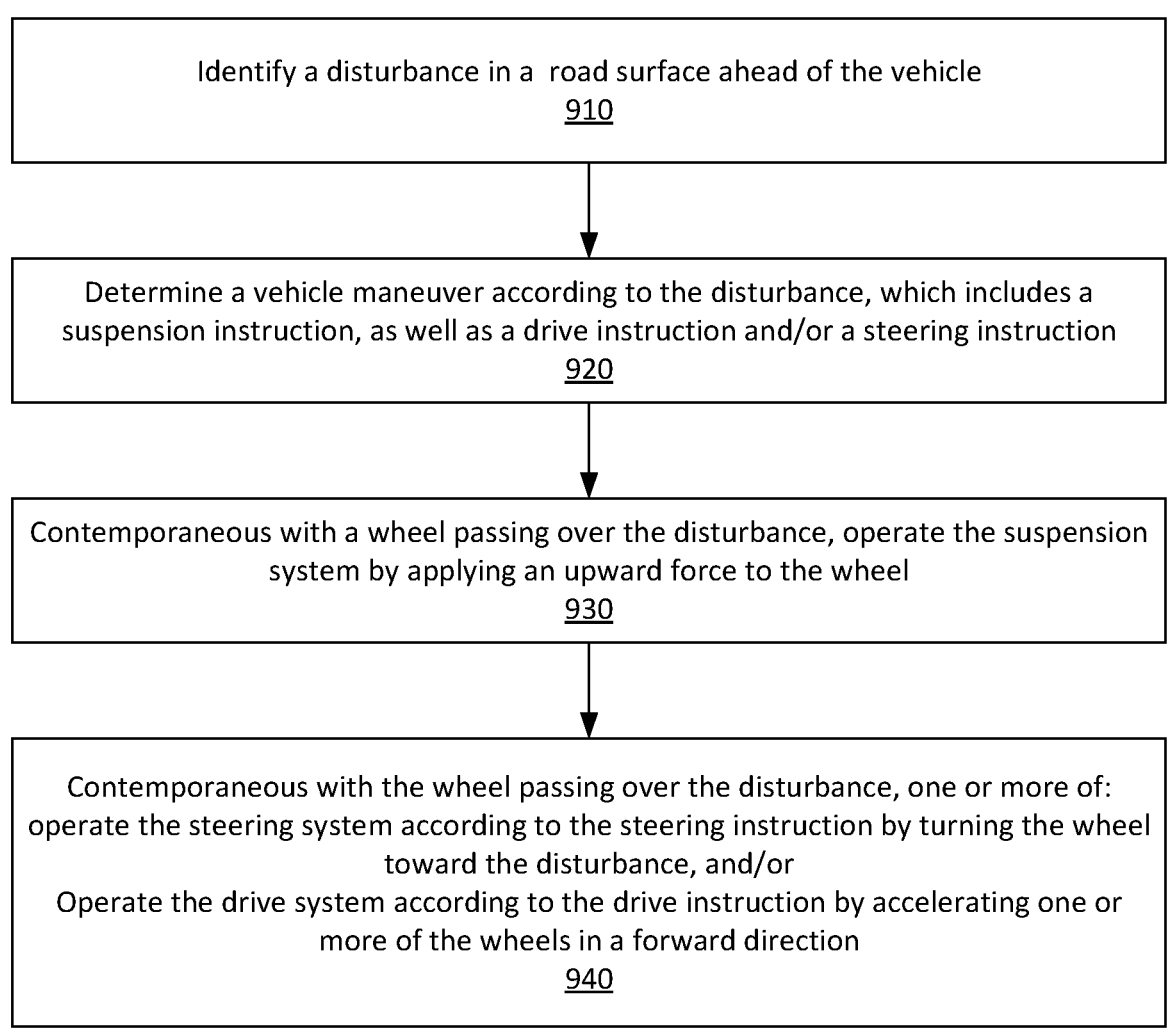
FIG. 9 is a flow chart of a method for controlling the vehicle to perform a vehicle maneuver according to a disturbance ahead of the vehicle.

Referring to FIG. 9, the suspension system 140 and one or more of the drive system 110 or the steering system 120 are controlled according to a disturbance ahead of the vehicle 100 to mitigate vertical and/or horizontal acceleration of the vehicle 100, or to mitigate other disturbances to the vehicle 100. The vehicle 100 identifies disturbances in the road surface ahead of the vehicle 100, and determines a vehicle maneuver by which the suspension system 140 is operated in conjunction with one or more of the drive system 110 and/or the steering system 120 to mitigate force transfer from the disturbance to the vehicle body 102. Acceleration of the vehicle body 102 is thereby mitigated, so as to improve ride comfort of passengers. Acceleration of the vehicle body 102 may be at a center of gravity of the vehicle 100, a center of volume of the vehicle 100, or at another point of the vehicle 100 (e.g., under one or more passengers thereof). Vehicle body disturbances other than acceleration of the vehicle body 102 may be mitigated instead of or in addition to acceleration, such as jerk (i.e., the derivative of the acceleration), the root mean square of acceleration (RMS), or other vehicle body disturbance.

When the vehicle 100 travels over a disturbance in a road surface, such as a pothole, the disturbance applies force to the wheels 104, which includes both a vertical component and horizontal components (e.g., in fore-aft and inboard-outboard directions). The vehicle maneuver operates the suspension system 140 to reduce net vertical force that might otherwise be transferred from the disturbance to the vehicle body 102 and, thereby, reduce net vertical acceleration of the vehicle body 102 and contemporaneously operates one or more of the drive system 110 and/or the steering system 120 to reduce net horizontal force transfer from the disturbance to the vehicle body 102 and, thereby, reduce net horizontal acceleration of the vehicle body 102. The suspension system 140 and the drive system 110 and/or the steering system 120 may instead be operated contemporaneously to mitigate the other vehicle body disturbances identified above (e.g., jerk, or the root mean square of acceleration).

The vehicle maneuver includes applying a force to the wheel 104 with the primary actuator 246, as the wheel 104 passes over the disturbance, which may be upward or downward. It should be noted that all of the wheels 104 may or may not pass over the disturbance. For example, in case of the disturbance being a pothole, the wheels 104 on only one side of the vehicle may pass over the disturbance in succession front to back in which case an upward force is applied to the wheels 104 on the side of the vehicle 100 of the disturbance. In case of the disturbance being a speed bump, all of the wheels 104 may pass over the disturbance in succession front to back in which case an upward force is applied to all of the wheels 104. By applying an upward force to the wheel 104 contemporaneous with passing over the disturbance (e.g., immediately prior to, during, and/or immediately after), a net vertical force applied to the wheel 104 by the disturbance is mitigated, such that vertical force transferred to and, thereby, vertical acceleration of the vehicle body 102 is mitigated.

The vehicle maneuver may also include turning one or more of the wheels 104 with the steering system 120 toward the disturbance as one or more of the wheels 104 pass over the disturbance. By turning the wheel 104 into the disturbance contemporaneous with passing over the disturbance, a net lateral force applied to the wheel 104 is mitigated, such that lateral force transferred to and, thereby, lateral acceleration of the vehicle body 102 is mitigated. The wheel 104 may be turned independent of the other wheels 104. Alternatively, other wheels 104 may instead or additionally be turned toward the disturbance contemporaneous with the wheel 104 passing over the disturbance.

The vehicle maneuver may also include accelerating one or more of the wheels 104 with the drive system 110 in a forward direction as one or more of the wheels 104 pass over the disturbance. For example, in case of the disturbance impacting the wheels 104 on one side of the vehicle 100, one or more of the wheels 104 on the side of the disturbance may be accelerated in the forward direction by the drive system 110 contemporaneous with one or more of the wheels 104 passing over the disturbance. Instead or additionally, one or more wheels 104 on both sides of the vehicle 100 may be accelerated in the forward direction by the drive system 110. By accelerating one or more of the wheels 104 in the forward direction contemporaneous with passing over the disturbance, a net fore-aft force applied to the wheel 104 is mitigated, such that fore-aft force transferred by the wheel 104 to and, thereby, fore-aft acceleration of the vehicle body 102 is mitigated. Accelerating the one or more wheels 104 with the drive system 110 may be performed by electric motors of the drive system 110, which may be more responsive than a gasoline engine.

As noted above, the suspension system 140 and the drive system 110 and/or the steering system 120 may instead be operated contemporaneously to mitigate the other vehicle body disturbances identified above (e.g., jerk, or the root mean square of acceleration).

As shown in FIG. 9, a method 900 is provided for a vehicle maneuver that mitigates vertical and horizontal force transfer to a vehicle body from a road disturbance. The vehicle maneuver may instead mitigate another vehicle body disturbance (e.g., jerk, RMS). The method 900 includes a first operation 910 of identifying and assessing a road disturbance, a second operation 920 of determining a vehicle maneuver according to the road disturbance, a third operation 930 of operating the suspension system 140 according to the vehicle maneuver contemporaneous with the wheel 104 of the vehicle 100 passing over the disturbance, and a fourth operation 940 of operating the drive system 110 and/or the steering system 120 according to the vehicle maneuver contemporaneous with the wheel 104 passing over the disturbance.

The first operation 910 of identifying a disturbance is performed by the sensing system 150, for example, in conjunction with the control system 160. The environment sensors 354 may observe the road surface ahead of the vehicle 100 to identify a road disturbance, such as a pothole. Instead or additionally, the environment sensors 354 may observe behavior of another vehicle ahead of the vehicle 100 and/or be identified using stored information (e.g., by correlating a position of the vehicle 100 determined by GPS with stored mapping information).

The second operation 920 of determining a vehicle maneuver is performed by the control system 160. The vehicle maneuver includes a suspension instruction and one or more of a drive instruction or a steering instruction. The suspension instructions include instructions to operate the suspension system 140 to apply an upward force to the wheel 104 passing over the disturbance. The drive instruction includes instructions to operate the drive system 110 to accelerate one or more of the wheels 104 contemporaneous with the wheel 104 or the other wheels 104 passing over the disturbance. The drive instruction may include accelerating one or more of the wheels 104 on a side of the vehicle 100 passing over the disturbance. The steering instructions includes operating the steering system 120 to turn the wheel 104 into the disturbance (e.g., to point the wheel 104 toward the disturbance) contemporaneous with the wheel 104 passing over the disturbance and/or turning others of the wheels 104 toward the disturbance contemporaneous with the wheel 104 passing over the disturbance.

The third operation 930 of operating the suspension system 140 is controlled, for example, by the control system 160 according to the suspension instruction. The control system 160 causes the suspension system 140 to force with the primary actuator 246 to the wheel 104 as the wheel 104 passes over the disturbance, which may be upward or downward. For example, by applying an upward force with the primary actuator 246 to the wheel 104, vertical force applied by the disturbance to the wheel 104 is mitigated, such that net vertical force applied to and acceleration of the vehicle body 102 (or other vehicle body disturbance) is mitigated. Applying a downward force may be advantageous, for example, resulting in reduced net force applied to the vehicle body 102.

The fourth operation 940 of operating the drive system 110 and/or the steering system 120 is controlled, for example, by the control system 160 according to the drive instruction and/or the steering instruction, respectively. The control system 160 may cause the drive system 110 to accelerate the one or more of the wheels 104 in the forward direction contemporaneous with the wheel 104 passing over the disturbance. As described above, by accelerating the wheel 104 forward, net fore-aft force applied by the disturbance to the wheel 104 is mitigated, such that net fore-aft force applied to and acceleration of the vehicle body 102 (or other vehicle body disturbance) is mitigated.

Figure 10:
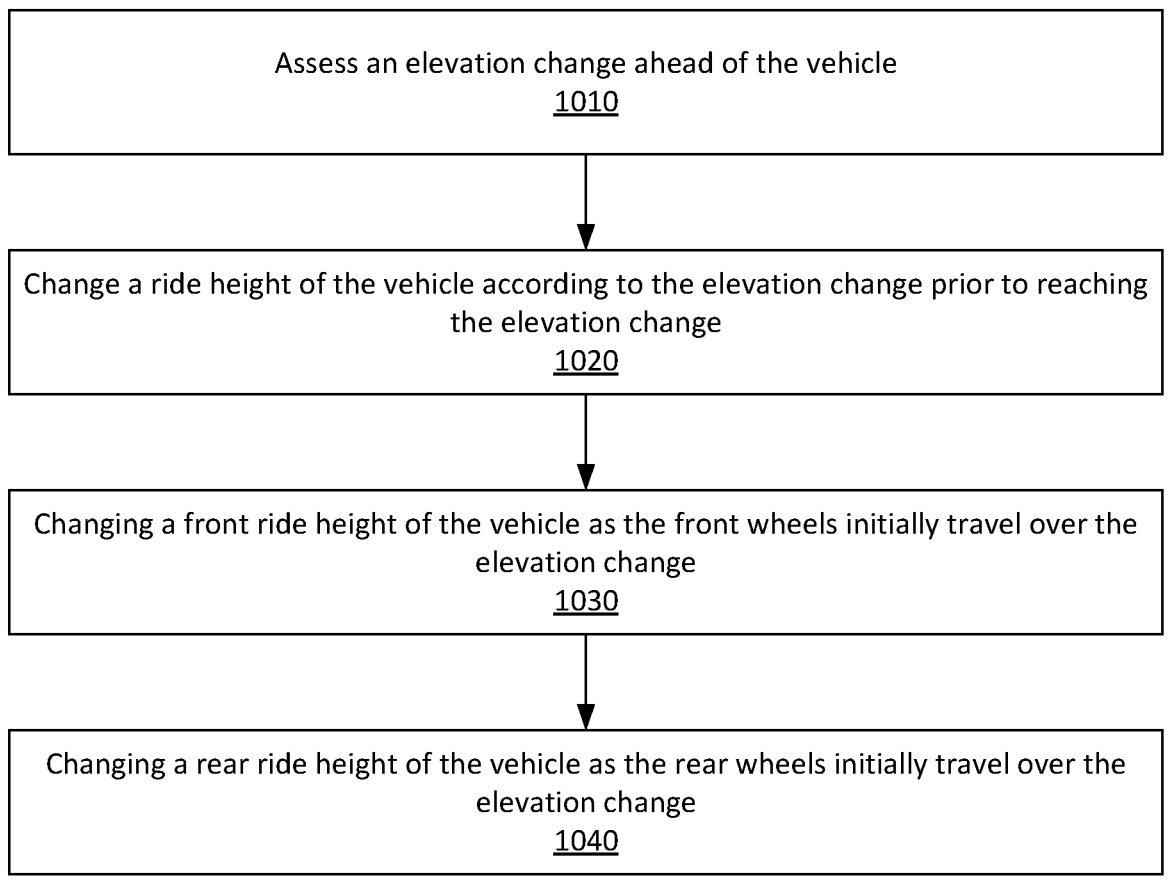
FIG. 10 is a flow chart of a method for operating the suspension system of the vehicle according to elevation changes ahead of the vehicle.

Referring to FIG. 10, the suspension system 140 is operated according to an elevation change ahead of the vehicle 100. The vehicle 100 identifies an elevation change ahead of the vehicle 100, such as an incline or a decline, and operates the suspension system 140 in advance of and concurrent with travelling through the elevation change. For example, the vehicle 100 may determine an upward hill in the road ahead of the vehicle 100, such that the road changes from a low slope (e.g., a horizontal) to an increased slope (e.g., an inclined slope). To reduce upward acceleration of the vehicle 100 when transitioning from the low slope to the increased slope, the suspension system 140 may be operated to increase a ride height of the vehicle 100 prior to reaching the increased slope. As the vehicle 100 travels from the low slope to the increased slope, the suspension system 140 may, in sequence, lower the ride height at a front of the vehicle 100 and subsequently lower the ride height at a rear of the vehicle 100. By raising the ride height prior to reaching the increased slope, the suspension system 140 provides more available downward suspension travel (i.e., downward movement of the vehicle body 102 relative to the wheels 104) and, thereby, more time over which the vertical velocity of the vehicle 100 changes (i.e., the vehicle 100 accelerates vertically) from the low slope to the increased slope. Thereby, lower vertical acceleration will be experienced by the vehicle body 102 and, thereby, passengers therein.

Conversely, the vehicle 100 may determine a downward hill in the road ahead of the vehicle 100, such that the road changes from a high slow (e.g., horizontal) to a decreased slope (e.g., a declined slope). To reduce downward acceleration of the vehicle 100 when transitioning from the high slope to the decreased slope, the suspension system 140 may be operated to decrease a ride height of the vehicle 100 prior to reaching the decreased slope, thereby providing more available upward suspension travel (i.e., upward movement of the vehicle body 102 relative to the wheels 104).

The suspension system 140 may be operated to lower or raise the ride height at a front of the vehicle 100 and at a rear of the vehicle 100 simultaneously, by the same or varying degrees, to heave the vehicle 100 (i.e., cause vertical motion) as opposed to pitch the vehicle 100 (i.e., tilt forward or rearward). In some circumstances, such as in the case of a short hill (e.g., less than a few lengths of the vehicle 100, such as when transitioning between public roadways and parking lots or private driveways), heaving the vehicle 100 may be preferable to pitching the vehicle 100 depending on sensitivities of occupants of the vehicle 100 (e.g., persons more sensitive to pitch than heave).

The elevation change may be determined with the sensing system 150 by observing the road ahead of the vehicle and/or by correlating a position of the vehicle 100 to mapping information that includes road elevation information. Notably, for decreased slopes, the sensing system 150 may be unable to directly observe elevation changes beyond a crest (e.g., peak) of a road surface. For example, the road elevation beyond such a crest may be a sustained downward slope (e.g., a hill) or an unsustained downward slope before (e.g., a dip). In such circumstances, the mapping information or other stored information (e.g., learned information or information received from other vehicles) or observing behavior of other vehicles may be more informative as to the changed slope according to which the ride height of the vehicle 100 may be lowered to provide more downward suspension travel.

As shown in FIG. 10, a method 1000 is provided for operating the suspension system 140 according to elevation changes ahead of the vehicle 100. The method 1000 includes a first operation 1010 of assessing an elevation change of a road ahead of the vehicle 100, a second operation 1020 of changing a ride height of the vehicle 100 according to the elevation change prior to the vehicle 100 reaching the elevation change, a third operation 1030 of changing a front ride height of the vehicle 100 as the front wheels 104 transition from a first slope to a second slope, and a fourth operation 1040 of changing a rear ride height of the vehicle 100 as the rear wheels 104 transition from the first slope to the second slope.

The first operation 1010 of assessing elevation changes of ahead of the vehicle 100 are performed by the sensing system 150. The sensing system 150 may observe the road ahead of the vehicle 100 with the environment sensors 354 to determine elevation changes and/or may correlate a position of the vehicle 100 to stored elevation information (e.g., mapping information). As referenced above, assessing negative elevation changes may advantageously be performed by correlating a position of the vehicle 100 to stored elevation information.

The second operation 1020 of changing a ride height of the vehicle 100 is performed by the suspension system 140, for example, as operated by the control system 160. In case of an increased slope being determined, the suspension system 140 increases a ride height of the vehicle 100, for example, by operating the primary actuator 246 and/or the spring seat actuators 252 associated with each of the wheels 104, which increases available downward suspension travel. In case of a decreased slope being determined, the suspension system decreases a ride height of the vehicle 100, for example, by operating the primary actuator 246 and/or the spring seat actuators 252 associated with each of the wheels 104, which increases available upward suspension travel. As noted above, the ride height is changed prior to the vehicle reaching the changed slope.

The third operation 1030 of changing a front ride height of the vehicle 100 is performed by the primary actuators 246 and/or the spring seat actuators 252 associated with the rear wheels 104 of the vehicle 100. The front ride height is decreased or increased as the front wheels 104 initially travel over the increased slope or the decreased slope, respectively.

The fourth operation 1040 of changing a rear ride height of the vehicle 100 is performed by the primary actuators 246 and/or the spring seat actuators 252 associated with the rear wheels 104 of the vehicle 100. The rear ride height is decreased or increased as the rear wheels 104 initially travel over the increased slope or the decreased slope, respectively.

Figure 11:
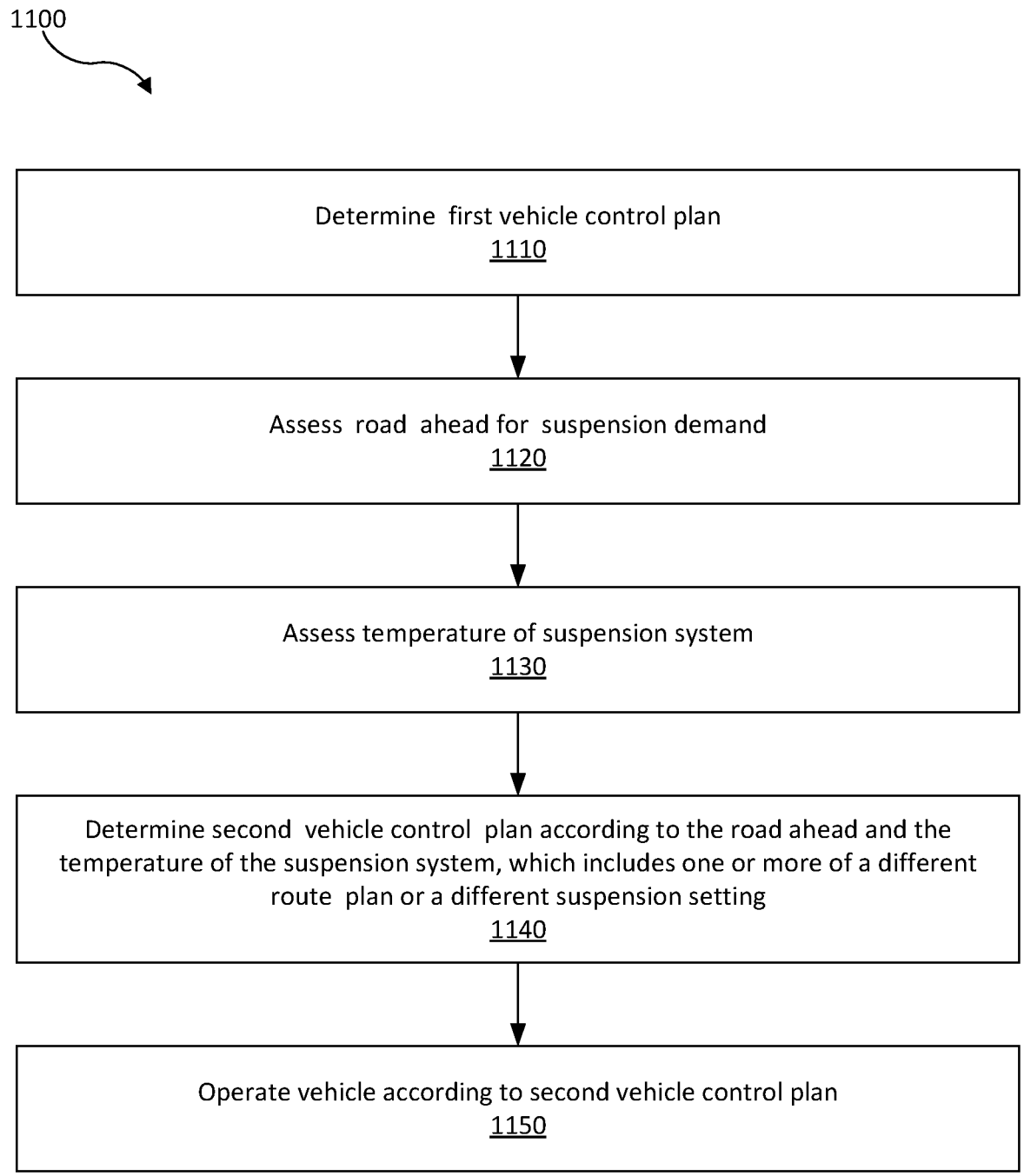
FIG. 11 is a flow chart of a method the vehicle according to a temperature of the suspension system and a road ahead of the vehicle.

Referring to FIG. 11, the vehicle 100 is controlled according to a temperature of the suspension system 140, such as the primary actuator 246, and conditions ahead of the vehicle 100. For example, the primary actuator 246 may have a reduced capacity (e.g., force output) at high temperatures or other temperature-related considerations may make operating at a reduced capacity advantageous (e.g., preserve durability). Conditions ahead of the vehicle 100 may, however, under a normal control methodology, require that the suspension system 140 to operate above such thresholds. By knowing the conditions ahead of the vehicle 100, the vehicle 100 may operate according to an alternative control methodology to reduce demand of the suspension system 140 (e.g., of the primary actuator 246). For example, if the road ahead is known to have a high quantity and/or magnitude of road disturbances, the vehicle 100 may be operated at a different speed, such as a slower speed resulting in lower force transfer from road disturbances to the unsprung mass, or in a different path known to have fewer and/or lower magnitude of road disturbances, such as in an adjacent lane or on another street. In another, example, the suspension system 140 may instead or additionally be operated in different manners. Depending on whether the road ahead is known to have high quantity and/or magnitude disturbances (i.e., requiring greater loading of the suspension system 140) or low quantity and/or magnitude disturbances, the suspension system 140 may be operated to reduce demand of the primary actuator 246. For example, the suspension system 140 may be operated for the spring 248 to transfer more force from the unsprung mass to the vehicle body 102 (e.g., by allowing more suspension travel to be utilized, such as by reducing damping force provided by the primary actuator 246), thereby reducing loading of the primary actuator 246.

As shown in FIG. 11, a method 1100 is provided for operating the vehicle 100 according to changes in temperature of the suspension system 140, such as of one or more of the primary actuators 246 thereof. The method 1100 includes a first operation 1110 of determining a first vehicle control plan, a second operation 1120 of assessing a road ahead for suspension demand of the vehicle 100, a third operation 1130 of assessing a temperature of the suspension system 140, a fourth operation 1140 of determining a second vehicle control plan, and a fifth operation 1150 of operating the vehicle 100 according to the second vehicle control plan.

The first operation 1110 of determining a vehicle control plan may, for example, be performed by the control system 160. The first operation 1110 includes determining a route plan of the vehicle 100 and a suspension setting of the suspension system 140. The route plan of the vehicle 100, for example, includes a direction (e.g., a road and/or lane) and a speed of the vehicle 100 that the vehicle 100 is to travel. The suspension setting of the suspension system 140, for example, is a setting according to which the suspension system 140 (e.g., the primary actuator 246) controls force transfer from road disturbances between the unsprung mass and the vehicle body 102, such as a damping setting.

The second operation 1120 of assessing the road ahead of the vehicle 100 for suspension demand may be performed by the control system 160 in conjunction with the sensing system 150. The first operation, for example, includes assessing a number (e.g., frequency) and/or a magnitude of road disturbances ahead of the vehicle 100, or otherwise quantifying the road surface and/or assessing possible suspension demand. The road ahead of the vehicle 100 may be assessed by the sensing system 150 observing the road ahead with the environment sensors (e.g., identifying, measuring, or otherwise detecting disturbances in the road surface) and/or behavior of other vehicles ahead of the vehicle 100. The road ahead of the vehicle 100 may instead or additionally be assessed for suspension demand with the vehicle sensors 352 in conjunction with stored information sources 356a (e.g., correlating GPS position to mapping information with road surface information, such as road disturbance information).

The third operation 1130 of assessing the temperature of the suspension system 140 may be performed by the control system 160 in conjunction with the sensing system 150 and, in particular, the suspension system sensors 352d (i.e., the temperature sensors) that may measure temperature of the one or more primary actuators 246.

The fourth operation 1140 of determining a second vehicle control plan may be performed by the control system 160 according to the assessment of the road ahead and the assessment of the temperature of the suspension system 140. For example, if the temperature of the suspension system 140 exceeds a threshold, the fourth operation 1140 includes determining the second vehicle control plan to have one or more of a different route plan or a different suspension setting than the first vehicle control plan. The different vehicle route plan may include having a different route (e.g., road and/or lane) and/or a different speed at which the vehicle is to travel, which would be expected to have lesser suspension demand (e.g., by having fewer and/or lower magnitude road disturbances). The different suspension setting may include transferring a lesser amount of force with the primary actuator 246 or allowing greater suspension travel for a given disturbance (e.g., by changing damping settings).

The fifth operation 1150 of operating the vehicle 100 according to the different vehicle control plan may be performed by the control system 160 in conjunction with the various output systems of the vehicle 100, such as the drive system 110, the steering system 130, and/or the suspension system 140.

Figure 12:
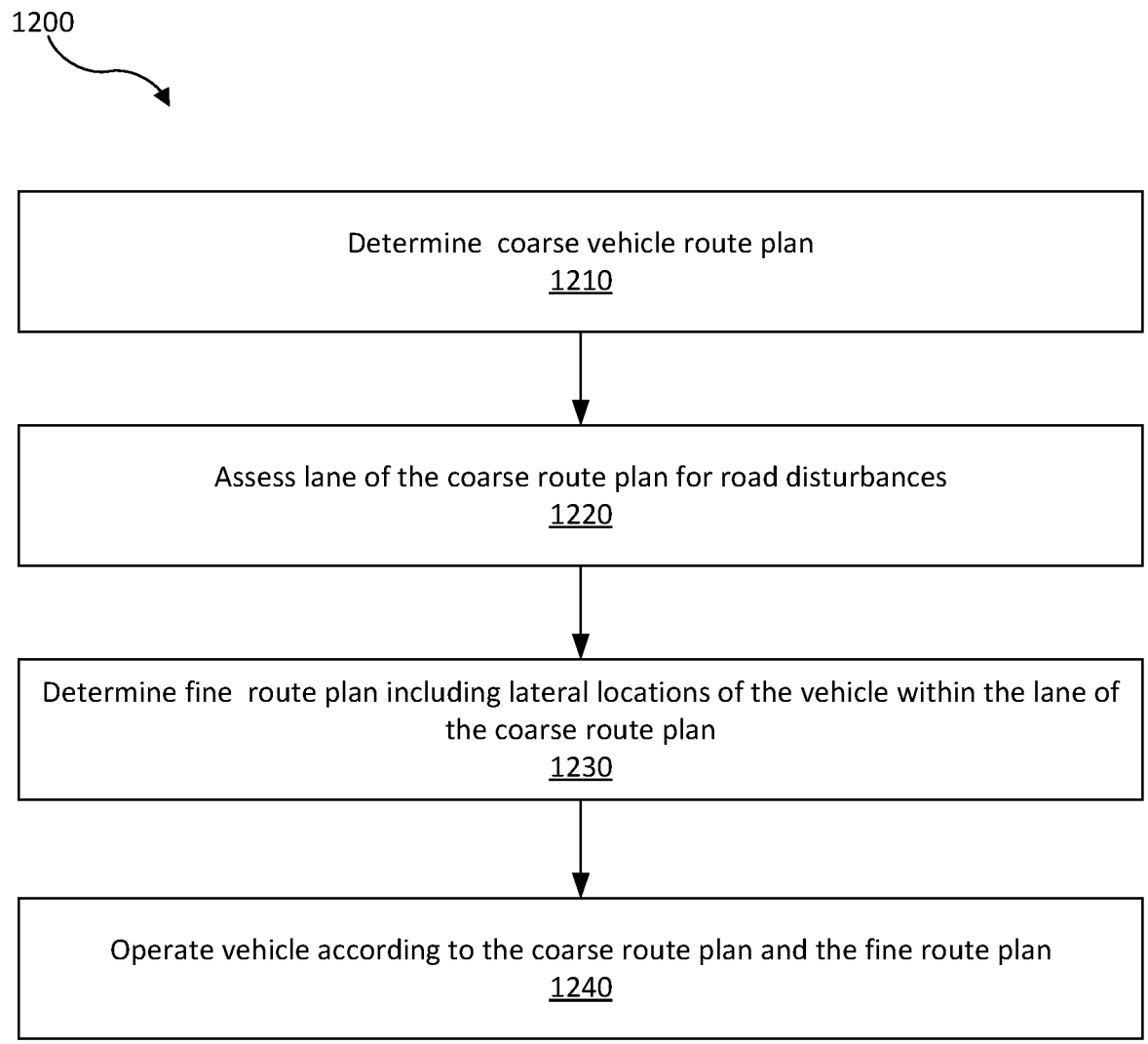
FIG. 12 is a flow chart of a method the vehicle according to a coarse route plan and a fine route plan.

Referring to FIG. 12, the vehicle 100 is controlled according to road disturbances ahead of the vehicle 100 and, in particular, is controlled according to a route plan having a coarse route plan and a fine route plan. Different sections of a road may have different road disturbances at different lateral locations within a lane, which may be regular disturbances or irregular disturbances. Regular disturbances are disturbances having a regular pattern (e.g., intentional pattern), such as rumble strips on one side of a lane that, while under construction, has shifted to a shoulder of the road. Irregular disturbances are disturbances having no regular pattern, such as bumps or undulations that develop in a road surface over time (e.g., cracks, potholes, and/or waviness, which may have developed from traffic and/or thermal expansion/contraction).

By knowing the lateral locations of the road disturbances ahead of the vehicle 100, the vehicle 100 may be guided to lateral locations within a lane to reduce the cumulative effect of road disturbances to the suspension system 140 (e.g., the magnitude, quantity, and/or other cumulative measure) and/or lateral acceleration to avoid such road disturbances, for example, to improve ride comfort or other considerations. For example, the vehicle 100 may determine a coarse route plan by which the vehicle 100 is routed over a lane of a road, and further determine a fine route plan by which the vehicle 100 is routed within the lane of a road to reduce road disturbances (e.g., as compared to traveling through a center of the lane).

The fine route plan is to be distinguished from avoiding a single obstacle or avoiding multiple obstacles in sequence in that the fine route plan accounts for multiple different road disturbances at different forward locations and allows the vehicle 100 to travel at different lateral locations within a lane for sustained period of time. This allows the vehicle 100 to avoid impacting road disturbances that are spaced apart in a forward direction, while also reducing steering inputs and lateral acceleration therebetween, which might otherwise detract from ride comfort. For example, road disturbances (e.g., potholes) may be detected on a right side of the lane (e.g., to impact the right wheels 104 of the vehicle 100 if centered in the lane) and 25 yards apart. The fine route plan may include the vehicle 100 traveling in a straight path in the lane to the left of the two disturbances, rather than steering back toward the center of the lane between the disturbances.

The fine route plan may be determined, for example, by sensing the road ahead (e.g., with the environment sensors) or according to the stored information sources 356 (e.g., mapping information). Sensing the road ahead may include assessing the quantity and/or magnitude of road disturbances at lateral locations in the lane ahead). The stored information sources 356 may include information from the vehicle 100 or other vehicles having travelled through different lateral portions (e.g., paths) of the lane to assess the road disturbances at lateral locations within a lane, for example, by recording movement of the vehicle 100 and/or the suspension system 140. The vehicle 100 or another vehicle may first assess road disturbances when traveling through one lateral region (e.g., path) of a lane over one section of road, and later assess the road disturbances when again travelling through another lateral region (e.g. another path) of the same lane over the same section of road.

As shown in FIG. 12, a method 1200 is provided for operating the vehicle 100 according to a coarse route plan and a fine route plan. The method 1200 includes a first operation 1210 of determining a coarse route plan, a second operation 1220 of assessing the lane of the coarse route plan, a third operation 1230 of determining a fine route plan, and a fourth operation 1240 of operating the vehicle 100 according to both the coarse route plan and the fine route plan.

The first operation 1210 of determining a coarse vehicle route plan may be performed by the control system 160. The first operation 1210 includes determining the coarse route plan to include a road and a lane of a road ahead of the vehicle 100 over which the vehicle 100 is to travel.

The second operation 1220 of assessing the lane of the coarse route plan may be performed by the control system 160 in conjunction with the sensing system 150. For example, the environment sensors may be used to assess quantity and/or magnitude of road disturbances at lateral locations within the lane over which the wheels 104 of the vehicle 100 may travel. Instead or additionally, the lane of the coarse route plan may be assessed according to stored information, such as mapping information or information previously gathered by the vehicle 100 or another vehicle when travelling through the lane previously at one or more different lateral positions.

The third operation 1230 of determining the fine route plan may be performed by the control system 160. The fine route plan includes lateral locations (e.g., a path) of the vehicle 100 within the lane of the coarse route plan. The fine route plan is determined according to the assessing of the lane of the course route plan to reduce disturbance to the vehicle 100, for example, as compared the vehicle 100 being centered in the lane. For example, the fine route plan may be determined to reduce the quantity, magnitude, and/or other cumulative measure of road disturbances over a forward section that will be impacted by the wheels 104 as the vehicle 100 travels through the lane. Instead or additionally, the fine route plan may be determined to be one of multiple previous paths that the vehicle 100 or another vehicle has travelled through the lane and was determined to reduce the quantity, magnitude, and/or other cumulative measure of road disturbances over the forward section of road as compared to the other of the multiple previous paths.

The fourth operation 1240 of operating the vehicle 100 according to the fine route plan may be performed by the control system 160 in conjunction with the steering system 130, which steers the vehicle 100 within the lane at the lateral locations of the fine route plan.

Figure 13:
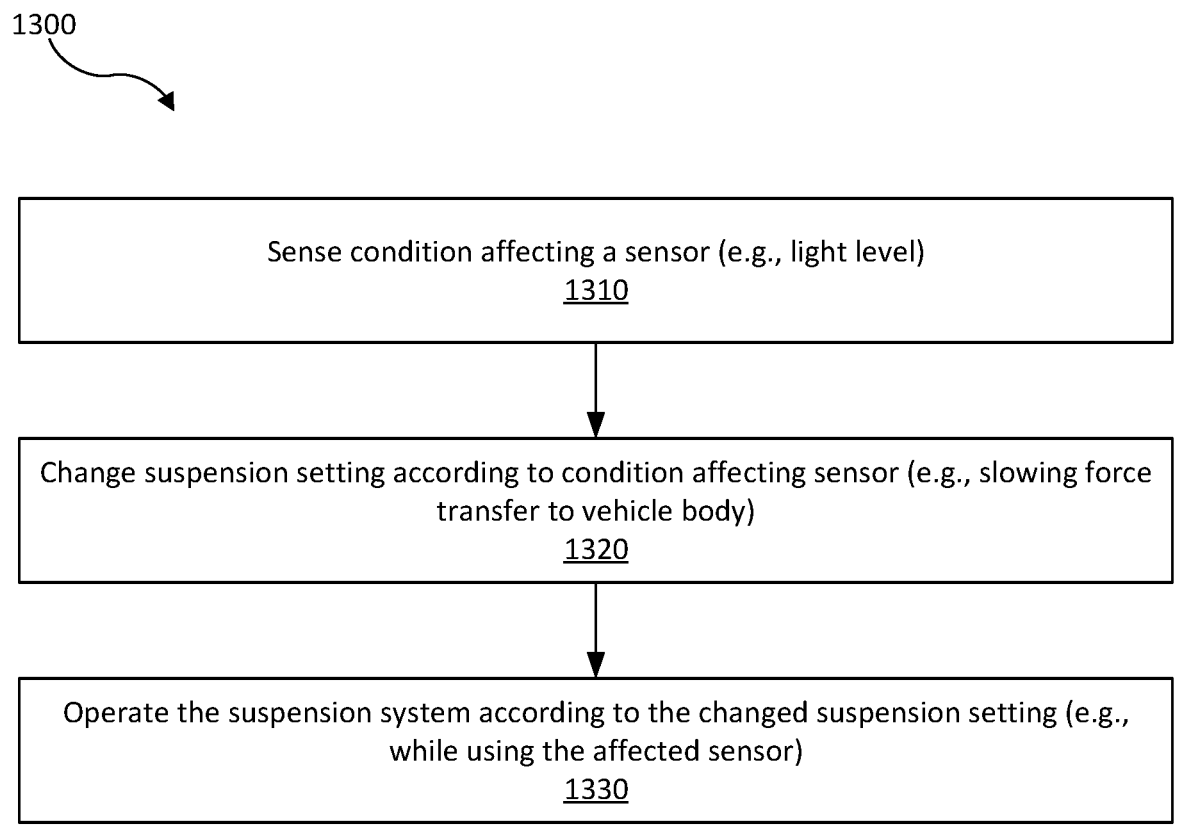
FIG. 13 is a flow chart of a method for operating the suspension system of the vehicle according to conditions affecting sensors of the vehicle.

Referring to FIG. 13, the suspension system 140 is controlled according to a characteristic of the sensing system 150. For example, the sensing system 150 may include cameras having image sensors, which require longer exposure times in darker conditions to obtain equivalent quality images as during light conditions. However, more movement, of the sensors 354 relative to the object or the object relative to the sensors 354, may occur during the longer exposure times, which may create image blur. The suspension system 150 may, however, be utilized to stabilize the sensors 354 to obtain improved image quality, for example, by softening the suspension system to reduce quick movement of the sensors 354 in dark conditions.

As shown in FIG. 13, a method 1300 is provided for operating the suspension system 140 according to a condition affecting the sensing system 160. The method 1300 includes a first operation 1310 of sensing a condition affecting a sensor, a second operation 1320 of changing a setting of the suspension system 150 according to the condition impacting the sensor, and a third operation 1330 of operating the suspension system 150 according to the changed suspension setting, while using the affected sensor (e.g., capturing images).

The first operation 1310 of sensing a condition impacting the sensing system 160 may be performed with the control system 160 in conjunction with the sensing system 150. The affected part of the sensing system may, for example, be cameras or another light sensitive sensor. The condition sensed may be light level determined by an ambient light sensor or a time of day (e.g., correlated to sunrise and sunset times for the given day).

The second operation 1320 of determining a changed suspension setting may be performed with the control system 160. For example, while the environment is determined to be bright, the suspension system 140 may operate according to a first setting by which force is transferred quickly to the vehicle body 102 to which the sensors are coupled, which may result in the sensors moving abruptly. This may be acceptable for cameras 354*f*, which require low exposure times in high light conditions. When the environment is determined to be dark, the suspension system 140 may operate according to a second setting by which force is transferred more slowly to the vehicle body 102 to which the various sensors (e.g., environment sensors, such as the camera 354*f*), which may result in the such sensors moving less abruptly (e.g., more slowly). This reduces amount of movement of the cameras 354f during exposure times relative to the environment being sensed, so as to improve sensing capabilities.

The third operation 1330 of operating the suspension system 150 may be controlled by the control system 160.

Figure 14:
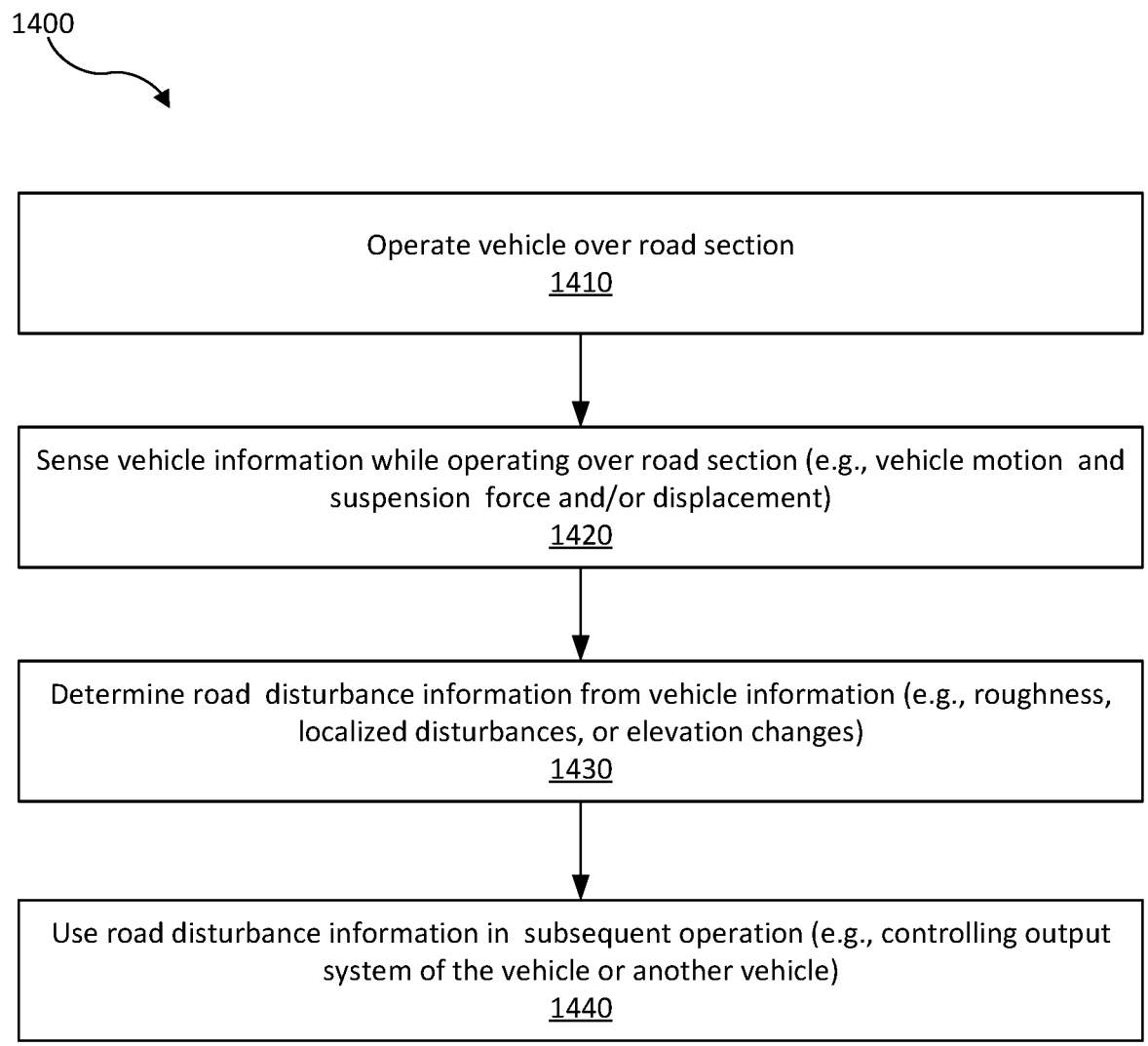
FIG. 14 is a flow chart of a method for controlling a vehicle according to previously-determined road disturbance.

Referring to FIG. 14, the vehicle 100 is configured to learn (e.g., sense and record) road disturbance information for later use. As the vehicle 100 travels over different roads and road sections, the vehicle body 102 and the suspension system 140 experience different movements and different forces, which may be sensed and recorded by the vehicle 100 or other vehicles for later use by the vehicle 100 or the other vehicles. For example, the vehicle 100 may detect road disturbances, such as roughness, localized disturbances, and/or elevation changes. Such road disturbances may be determined, for example, with the motion sensors 352e of the vehicle 100 (e.g., measuring acceleration of the vehicle body 102) and/or the suspension system sensors 352d (e.g., measuring displacement and/or force of the primary actuators 246). The learned road disturbance information may be used in the methods above (e.g., controlling the vehicle 100 according to the roughness), spatially locating the vehicle 100 when GPS is unavailable (e.g., based on signature for a particular location, such as railroad tracks), for determining the fine route plan within a lane (e.g., by travelling different paths through sections of roads and comparing road disturbance information), and/or for other uses (e.g., communicating road conditions for infrastructure uses, such as identifying required repairs and/or providing public alerts pertaining to the road disturbances).

As shown in FIG. 14, a method 1400 is provided for learning road disturbance information with the suspension system 140. The method 1400 generally includes a first operation 1410 of operating the vehicle 100 over a section of road, a second operation 1420 of recording vehicle information pertaining to road disturbances of the section of road, a third operation 1430 of determining road disturbance information from the vehicle information, and a fourth operation 1440 of using the road disturbance information.

The first operation 1410 of operating the vehicle 100 over a section of road is controlled, for example, by the control system 150, such as when transporting a passenger, between transporting passengers, or on a sensing route (e.g., dedicated purpose for gathering road disturbance information).

The second operation 1420 of recording vehicle information is performed with the sensing system 150. The vehicle sensors 352, including the suspension systems sensors 352d and the motion sensors 352e, measure motion thereof, which may be recorded against a position of the vehicle 100 (e.g., determined by GPS). For example, the motions sensors 352e may measure acceleration of the vehicle body 102. The suspension system sensors 352d may measure displacement and/or force of the primary actuator 246.

The third operation 1430 of determining road disturbance information from the vehicle information may be performed by the control system 160. For example, the vehicle information may be used to determine roughness (e.g., from repeated force inputs to the suspension system 140 for a given speed of the vehicle), local disturbances (e.g., potholes from sharp decrease and subsequent increase in force to the primary actuator 246 associated with one of the wheels 104), and/or elevation changes (e.g., from acceleration of the vehicle body 102 and changes in the displacement of the primary actuators 246). The road disturbance information is then stored by the vehicle 100 and/or transferred to another vehicle. The road disturbance information may, alternatively, be transferred to a remote system, such as an infrastructure system or a rebroadcasting system. Such an infrastructure system may be used to monitor road conditions, for example, to identify required road repairs. Such a rebroadcasting system may send the road disturbance information to other vehicles, for example, to control the output systems of the other vehicles (e.g., suspension systems thereof) and/or to provide alerts about road conditions thereto.

The fourth operation 1440 of using the road disturbance information is performed, for example, with the control system 160, which controls one or more of the output systems of the vehicle 100 according to the road disturbance information (e.g., according to one of the methods described above, or another suitable method).

Referring to FIG. 15, the suspension system 140 is controlled to achieve a suspension stiffness and/or a body ride frequency according to conditions ahead of the vehicle 100. As referenced above, the primary actuator 246 and the spring 248 form two parallel load paths by which input force is transferred from the wheel 104 (e.g., from a road disturbance) to the vehicle body 102. For a given input force, stiffness of the suspension system 140 may be increased or decreased by controlling the primary actuator 246 to transfer, respectively, a higher or lower proportion of the given input force to the vehicle body 102. This in turn causes the spring 248 to transfer a lower or higher proportion, respectively, of the force to the vehicle body 102 and results in the wheel 104 travelling less or more, respectively relative to the vehicle body 102. It may be beneficial from an energy consumption standpoint to operate the suspension system 140 predominantly with a low stiffness and increase the stiffness when predicted to be needed, since the primary actuator 246 consumes more power when providing increased stiffness. The stiffness of the suspension system 140 may be increased from a low stiffness level (e.g., a default stiffness level) based on conditions ahead of the vehicle 100, for example, to prevent the suspension system 140 from reaching full suspension travel (e.g., reaching end stops of the primary actuator 246) and/or to prevent low frequency movement of the vehicle body 102 that might be uncomfortable to the user (e.g., pitching and rolling).

The stiffness of the suspension system 140 may be changed according to the road conditions using, for example, gain scheduling. The suspension system 140 and, in particular, the primary actuator 246 may be controlled according to a suspension control logic that, for example, controls output of the primary actuator 246 (e.g., torque and/or direction) according to the suspension system sensors 352d (e.g., force, position, and/or motion) of the primary actuator 246. For those road conditions for which increased stiffness is desired, the gain may be increased, such that the output of the primary actuator 246 (e.g., the torque) achieves a higher stiffness. Other inputs for gain scheduling may include, for example, speed of the vehicle 100 and/or weight of the vehicle 100 (e.g., which may vary according to occupants thereof). The stiffness of the suspension system 140 may be changed in other manners, for example, by changing target parameters of the suspension control logic (e.g., travel and/or force transfer of the primary actuator 246).

As shown in FIG. 15, a method 1500 is provided for controlling suspension stiffness according to road conditions ahead of the vehicle 100. The method 1500 generally includes a first operation 1510 of determining a first suspension stiffness setting, a second operation 1520 of operating the suspension system 140 according to the first suspension stiffness setting, a third operation 1530 of determining a second suspension stiffness setting that achieves different stiffness according to conditions ahead of the vehicle 100, a fourth operation 1540 of operating the suspension system 140 according to the second suspension stiffness setting. The operations of the method 1500 are repeated, so as to continuously change the suspension stiffness according to road conditions ahead of the vehicle 100.

The first operation 1510 of the determining a first suspension stiffness setting of the suspension system 140 may, for example, include setting the first suspension setting to have a low stiffness, which may be a low stiffness setting at which the suspension system 140 is typically operated (e.g., considering other parameters, such as speed and/or weight of the vehicle 100). As referenced above, the first suspension stiffness setting may be a first gain value.

The second operation 1520 of operating the suspension system 140 according to the first suspension stiffness setting is performed by the primary actuator 246. For example, the primary actuator 246 outputs torque according to suitable control logic that accounts for the first suspension stiffness setting (e.g., using gain scheduling).

The third operation 1530 of determining a second suspension stiffness setting according to the road conditions ahead is performed similar to various operations described previously (see, e.g., the operations 630, 632). For example, the sensing system 150 may observe or otherwise determine environmental (e.g., road) conditions ahead of the vehicle 100, which may include road direction, presence of potential obstacles, road friction conditions, and/or elevation changes. Upon detecting environmental conditions that are either likely to cause the suspension system 140 to encounter full travel (e.g., of the primary actuator 246) or induce undesirable low frequency motion (e.g., pitching and/or rolling) at the first suspension stiffness setting, the second suspension stiffness setting is changed from the first suspension stiffness setting. If the first suspension stiffness setting is the low or default stiffness setting, or if the suspension system 140 is likely to encounter full travel, the second suspension stiffness setting is determined to provide higher stiffness. In other circumstances, the second suspension stiffness setting is determined to provide lower stiffness (e.g., if the first suspension stiffness setting is not the low or default setting and is predicted to cause the undesirable low frequency motion). The second suspension stiffness setting may be a second gain value that is different from the first gain value.

The fourth operation 1540 of operating the suspension system 140 according to the second suspension stiffness setting is performed by the primary actuator 246. For example, the primary actuator 246 outputs torque according to suitable control logic that accounts for the second suspension stiffness setting (e.g., using gain scheduling).

The first through fourth operations 1510, 1520, 1530, 1540 the repeated, so as to continually adjust the suspension stiffness setting. For example, if the second suspension stiffness setting is a high stiffness, the suspension stiffness setting may be changed to the low or default stiffness setting, or may be changed to an even higher stiffness setting, according to the environmental conditions. Preferably, the suspension system 140 will be operated predominantly in a low or default stiffness setting, such as more than 50%, 70%, 85%, or 90% of the time, while operating in the one or more high stiffness settings only momentarily, in short durations, or otherwise substantially less time than in the low or default stiffness setting.

Figure 16:
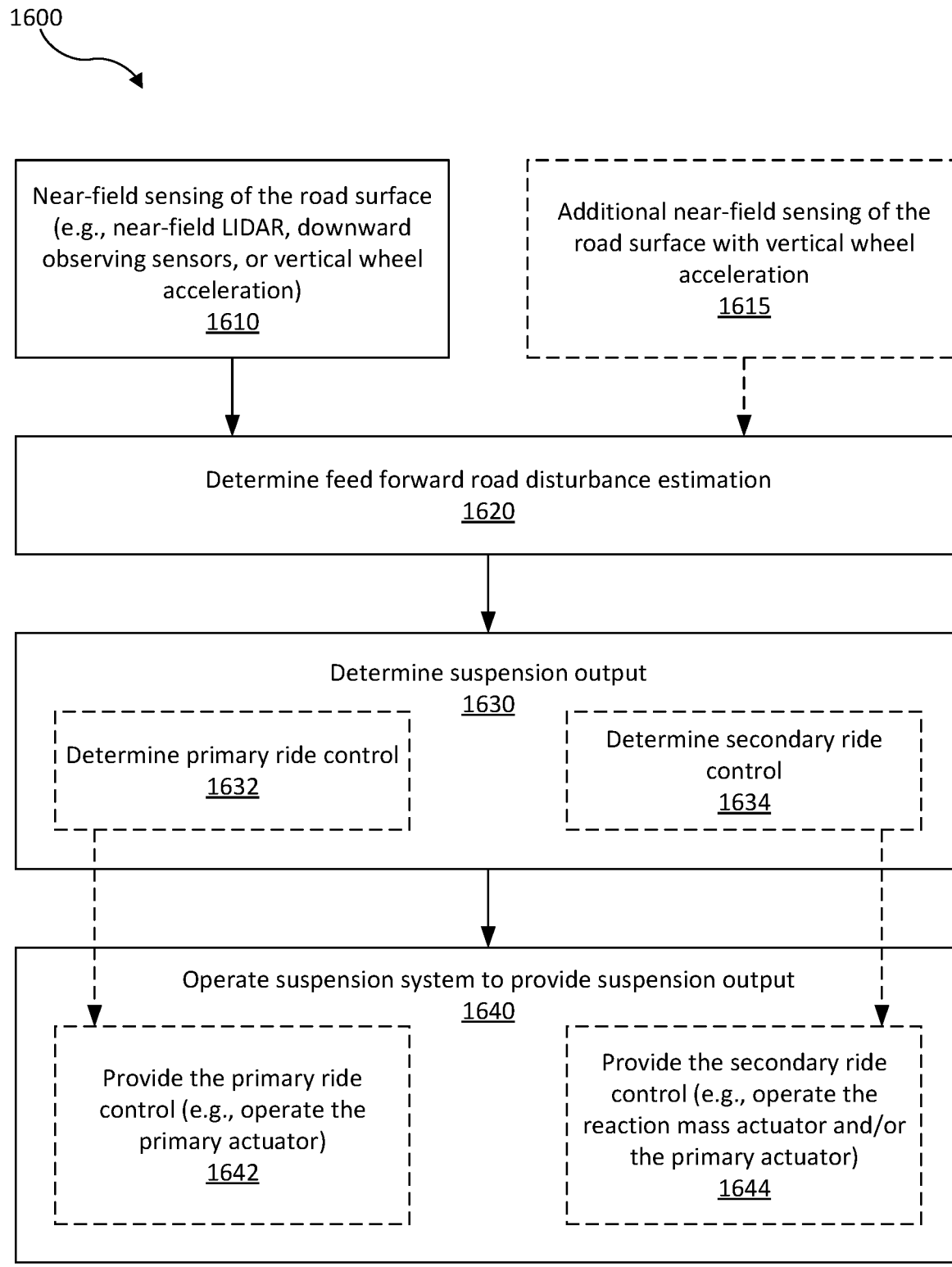
FIG. 16 is a flow chart of a method for feedforward suspension control according to near-field sensing of a road surface.

Referring to FIG. 16, the suspension system 140 is controlled according to a feed-forward control system that uses near-field sensing of road disturbances as the feedforward. The feedforward may include, for example, near-field road disturbance information, which is road disturbance information obtained from sensors that observe the road surface in close proximity to the vehicle 100 (e.g., underneath the vehicle 100, within 50, 25, 10, 5, feet or less of a front of the vehicle 100, or 5, 3, 2, 1, or 0.5 seconds or less of travel time until the front of the of the vehicle 100 passes thereover) and/or acceleration (e.g., vertical acceleration) of the wheel 104. The near-field road disturbance information may be determined with near-field LIDAR sensors (e.g., the LIDAR sensors 354a) or vertical distance sensors (e.g., laser-based, ultrasonic or other downward-facing sensors) that observe the road surface. Acceleration of the wheel 104 may be determined with one or more accelerometers coupled to steering or suspension components that are in close proximity to and move in unison with the wheel 104 (e.g., a steering knuckle or the suspension arm 244). Vertical acceleration of the wheel 104 is considered to include proxies thereto (e.g., vertical acceleration of the steering knuckle or the suspension arm 244). A road disturbance estimation is made according to the near-field road disturbance information, the vertical wheel acceleration, or both. Using both the near-field road disturbance information in combination with the vertical acceleration of the wheel 104 as feedforwards may provide a road disturbance estimation that has reduced noise as compared to the near-field road disturbance information or the vertical wheel acceleration alone. The road disturbance estimation is then provided as the feedforward to a primary ride control system (e.g., a feedback control system) by which the primary actuator 246 is operated to provide primary ride control (e.g., ride control other than at frequencies of the secondary ride control). The road disturbance estimation may, instead or additionally, be provided to a secondary ride control system (e.g., another feedback control system) by which the reaction mass actuator 250 and/or the primary actuator 246 are operated to provide secondary ride control.

As shown in FIG. 16, a method 1600 provided feedforward suspension control based on near-field road disturbance estimation. The method 1600 generally includes a first operation 1610 of near-field sensing of a road surface, a second operation 1620 of determining a feedforward road disturbance estimation according to the sensing, a third operation 1630 of determining suspension output according to the feedforward road disturbance estimation, and a fourth operation 1640 of operating the suspension system according to suspension output. The method 1600 may also include a parallel first operation 1615 of additional near-field sensing of the road surface that is performed in parallel with the first operation 1610 and may be used in the second operation 1620 of the determining of the feedforward road disturbance estimation. The third operation 1630 of the determining the suspension control may include a first suboperation 1632 of determining a primary ride control and a second suboperation 1634 of determining a secondary ride control. The fourth operation 164 of the operating of the suspension system may include a first suboperation 1642 of providing the primary ride control and a second suboperation 1644 of provide the secondary ride control.

The first operation 1610 of the near-field sensing of the road surface is performed, as described above, by observing the road surface proximate or below the vehicle or measuring acceleration (e.g., vertical acceleration) of the wheel. The observing of the road surface may be performed with near-field LIDAR sensors, ultrasonic sensors, laser-based sensors, as was described above (e.g., at the distances described above). The acceleration of the wheel 104 is measured with one or more accelerometers on steering or suspension components that are coupled to and move in unison with the wheel 104 (e.g., a steering knuckle or a suspension arm).

The parallel first operation 1615 of the near-field sensing of the road surface is performed by measuring acceleration of the wheel 104. The parallel first operation 1615 may be performed in some but not all embodiments (as indicated by the dashed lines). If the parallel first operation 1615 is performed, the first operation 1610 is performed by observing the road surface.

The second operation 1620 of the determining the feed forward road disturbance estimation is performed according to one or both of the first operations 1610, 1615. The feed forward road disturbance estimation may include, for example, the magnitude of a road disturbance and the timing or frequency thereof. For example, the feedforward road disturbance estimation may be quantified as a frequency and magnitude (e.g., vertical distance).

The third operation 1630 of the determining the suspension output is determined with the feedforward road disturbance estimation as a feedforward thereto. The third operation 1630 may be performed according to other inputs, such as with a feedback control system in which outputs (e.g., magnitude, such as stroke distance, frequency, and/or force) of the primary actuator 246, the reaction mass actuator 250, or the tuned mass damper are inputs according to which the suspension output is determined.

The suboperation 1632 includes determining primary ride control that, as described above, is provided at least at low frequencies (e.g., 10 Hz or below) that are below the natural frequency of the unsprung mass that include the wheel 104.

The suboperation 1634 includes determining secondary ride control that, as described above, is active damping of road inputs to an unsprung mass, which occur at frequencies near the natural frequency of the unsprung mass or that might otherwise induce resonance in the unsprung mass or wheel hop.

The fourth operation 1640 operating the suspension system 140 performed according to the suspension output. The subperiod 1642 includes providing the primary ride control with the primary actuator. The suboperation 1644 includes providing the secondary ride control with the reaction mass actuator 1650 and/or the primary actuator 246 (e.g., if the capacity threshold is exceeded by the reaction mass actuator 250 or the tuned mass damper).

What is claimed is:

1. A vehicle comprising:
   a vehicle body;
   a wheel;
   a suspension system that supports the vehicle body relative to the wheel, wherein the suspension system includes a primary actuator that transfers force between the wheel and the vehicle body, the primary actuator being a ball screw actuator;
   a sensing system for sensing an environmental condition ahead of the vehicle, learning road disturbance information from the suspension system, and obtaining real-time feedback from the suspension system; and
   a control system that determines a road disturbance estimation based on the sensed environmental condition and the learned road disturbance information, determines a suspension output including a primary ride control and a secondary ride control based on the road disturbance estimation and the real-time feedback, and operates the suspension system according to the suspension output,
   wherein the control system operates the primary actuator with a first suspension stiffness setting and with a second suspension stiffness setting that are determined according to the road disturbance estimation.

2. The vehicle according to claim 1, wherein sensing the environmental condition includes observing a road surface ahead of the vehicle and the real-time feedback from the suspension system includes a vertical wheel acceleration of the wheel.

3. The vehicle according to claim 1, wherein learning the road disturbance information includes recording vehicle information as the vehicle is operated over a section of road.

4. The vehicle according to claim 1, wherein the first suspension stiffness setting is a low stiffness and the second suspension stiffness setting is a high stiffness that is greater than the low stiffness.

5. The vehicle according to claim 4, wherein the control system operates the primary actuator with the second suspension stiffness setting when the sensed environmental condition ahead of the vehicle includes a localized road feature.

6. The vehicle according to claim 5, wherein the localized road feature is a pothole or a bump.

7. The vehicle according to claim 1, wherein the first suspension stiffness is a default setting at which the control system predominantly operates the primary actuator.

8. The vehicle according to claim 1, wherein the first suspension stiffness setting and the second suspension stiffness setting are controlled using gain scheduling.

9. The vehicle according to claim 1, wherein the primary ride control includes active damping of inputs to the wheel occurring below 10 Hz.

10. An active suspension system for a vehicle comprising:
    a wheel;
    an actuator coupled to the wheel;
    a suspension component coupled to the wheel and the actuator and configured to support the wheel;
    a sensing system for near-field sensing of a road surface relative to the vehicle; and
    a control system that determines a feedforward road disturbance estimation according to the near-field sensing, determines suspension output with the feedforward road disturbance estimation, and controls the actuator based on the suspension output,
    wherein the suspension output includes one or more of primary ride control or secondary ride control, the primary ride control includes active damping of inputs to the wheel occurring below 10 Hz, and the secondary ride control is active damping at frequencies of other inputs to the wheel occurring near a natural frequency of an unsprung mass that includes the wheel.

11. The active suspension system according to claim 10, wherein the near-field sensing includes one or more of observing the road surface in close proximity to the vehicle or sensing vertical wheel acceleration.

12. The active suspension system according to claim 11, wherein the near-field sensing includes both of observing the road surface and sensing the vertical wheel acceleration.

13. The active suspension system according to claim 10, wherein the suspension output includes both of the primary ride control and the secondary ride control.

14. The active suspension system according to claim 10, wherein the control system further determines the suspension output according to feedback from a sensor coupled to the suspension component.

15. The active suspension system according to claim 10, wherein the control system further determines the suspension output according to feedback from a sensor configured to observe a road surface in close proximity to the vehicle.

16. A method for feedforward suspension control of a suspension system of a vehicle comprising:
- performing near-field sensing of a road surface proximate to the vehicle;
- obtaining real-time feedback from the suspension system;
- determining a feedforward road disturbance estimation according to the near-field sensing and the real-time feedback;
- determining a suspension output according to the feedforward road disturbance estimation, the suspension output including a primary ride control and a secondary ride control; and
- operating the suspension system according to the suspension output which includes controlling a primary actuator with a first suspension stiffness setting and a second suspension stiffness setting that has a greater stiffness than the first suspension stiffness setting.

17. The method according to claim 16, wherein the real-time feedback includes sensing a vertical wheel acceleration of the vehicle.

18. The method according to claim 5, wherein the first suspension stiffness setting is a default setting at which the suspension system controls the primary actuator.

19. The method according to claim 16, further comprising learning road disturbance information from the suspension system and determining the feedforward road disturbance estimation is based on the near-field sensing and the learned road disturbance information.

20. The method according to claim 16, wherein the first suspension stiffness setting and the second suspension stiffness setting are controlled using gain scheduling.

* * * * *